United States Patent [19]
Nevills

[11] Patent Number: 5,452,971
[45] Date of Patent: Sep. 26, 1995

[54] ROTARY END CUTTING TOOL

[76] Inventor: Alva D. Nevills, 1320 Broadview Dr., Richland, Wash. 99352

[21] Appl. No.: 207,949

[22] Filed: Mar. 8, 1994

[51] Int. Cl.[6] ..................................................... B23B 51/02
[52] U.S. Cl. .......................... 408/230; 408/229; 408/233; 408/713
[58] Field of Search ..................... 408/227, 229, 408/230, 715, 713, 223–225

[56] References Cited

U.S. PATENT DOCUMENTS

| | | | |
|---|---|---|---|
| 4,210,406 | 7/1980 | Berry, Jr. | 408/223 |
| 4,222,690 | 9/1980 | Hosoi | 408/230 |
| 4,381,162 | 4/1983 | Hosoi | 408/230 |
| 4,400,119 | 8/1983 | Clement | 408/223 |
| 4,556,347 | 12/1985 | Barish | 408/230 |
| 4,594,034 | 6/1986 | Maier | 408/230 |
| 4,856,944 | 8/1989 | Reinauer | 408/59 |
| 4,950,108 | 8/1990 | Roos | 408/230 |
| 4,961,672 | 10/1990 | Lindberg | 408/230 |
| 5,011,342 | 4/1991 | Hsu | 408/224 |
| 5,038,642 | 8/1991 | Alverio et al. | 408/230 |
| 5,065,647 | 11/1991 | Johnson | 408/230 |
| 5,088,863 | 2/1992 | Imanaga et al. | 408/230 |
| 5,160,232 | 11/1992 | Maier | 408/230 |

FOREIGN PATENT DOCUMENTS

| | | | |
|---|---|---|---|
| 3730377 | 3/1989 | Germany | 408/230 |

*Primary Examiner*—Steven C. Bishop

[57] ABSTRACT

This Improved Rotary End Cutting Tool is a completely new concept in twist-drill theory, design, and method of construction. Which will revolutionize the rotary end cutting tool systems as presently known today; especially in larger drill (30) diameters. The new concept of an incurvate cutting-edge (38), purposely orchestrated and offset volumetric grooves (41) combined with a tapered residual core-area (50) in the forward conical forward-end, along with all other renovative improvements. Has virtually resolved drill-chatter, rapid dulling, poor centering, penetration, and even breakage; naming just a few from a list of problems inhabiting currently marketed twist-drills (30). With the overall combined improvements, being to extensive to list herein, having afforded a uniquely simple insert cutting-unit (47) displaying a fixed and removable version capable of equally performing as well as its one-piece counterpart twist-drill (30). Which has demonstrated being compatible with most all work-piece materials suitable for drilling; producing a more precisioned, near mirror-like, wall-finished hole in many materials drilled thereby. And near 4 times faster and 7 times longer production-time in comparison to a comparable-sized presently marketed twist-drill (30). Convincingly, a superior rotary end cutting tool in all elements of this Art; which overall, as stated, will revolutionize the rotary end cutting tool industry after introduction of its entirety.

15 Claims, 5 Drawing Sheets

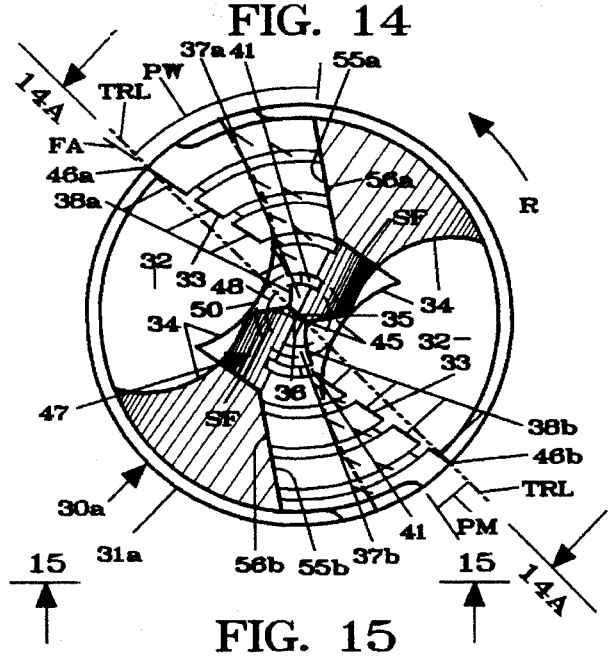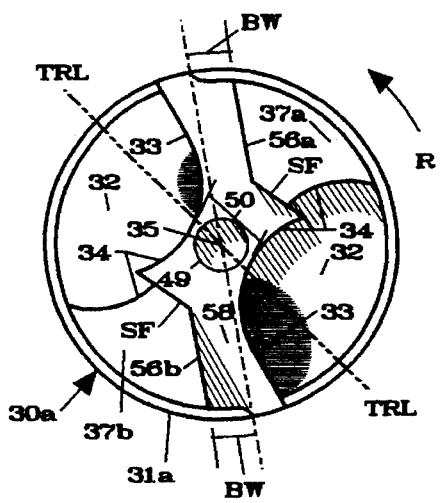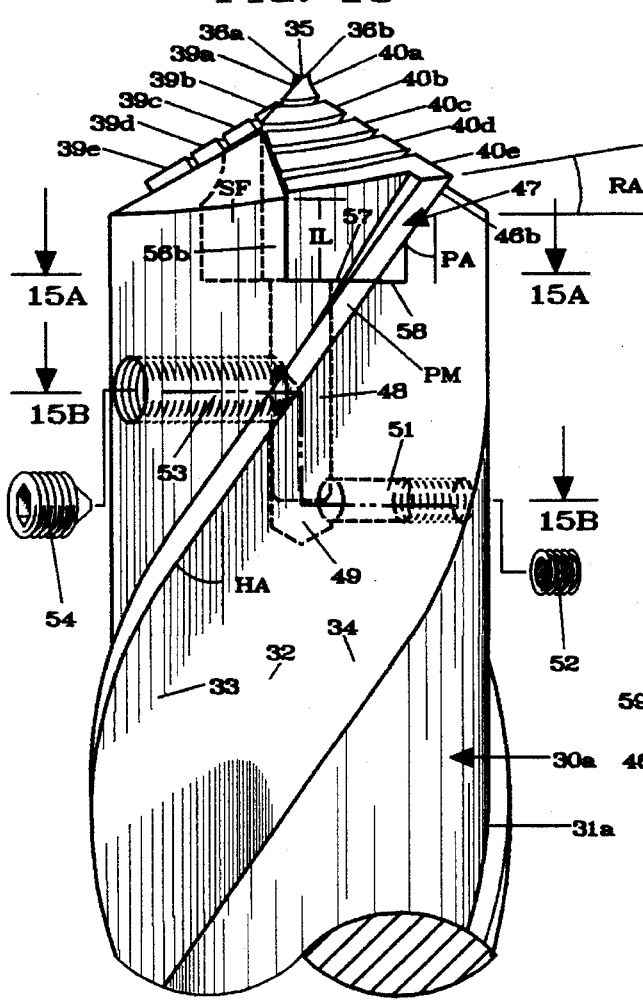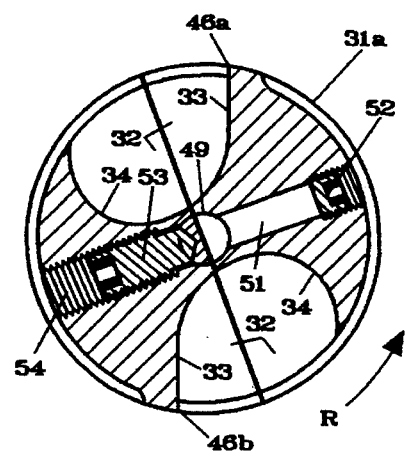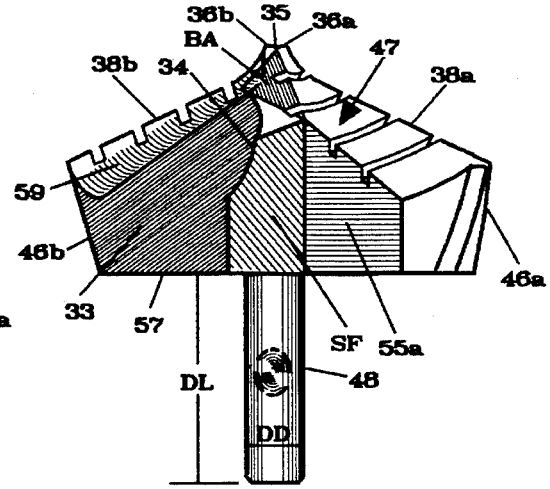

FIG. 16
EXPLODED VIEW WITHOUT
TAPERED CONCAVE SWALE
FIG. 17
REMOVABLE INSERT — FULL VIEW
WITH TAPERED CONCAVE SWALE
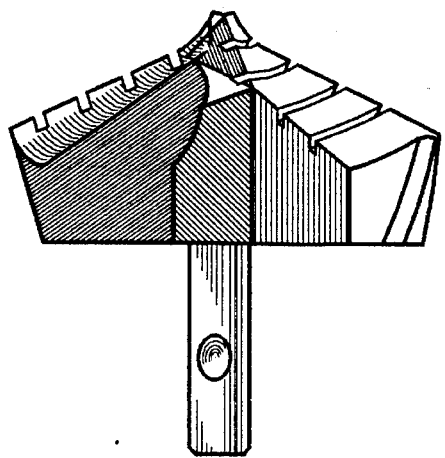
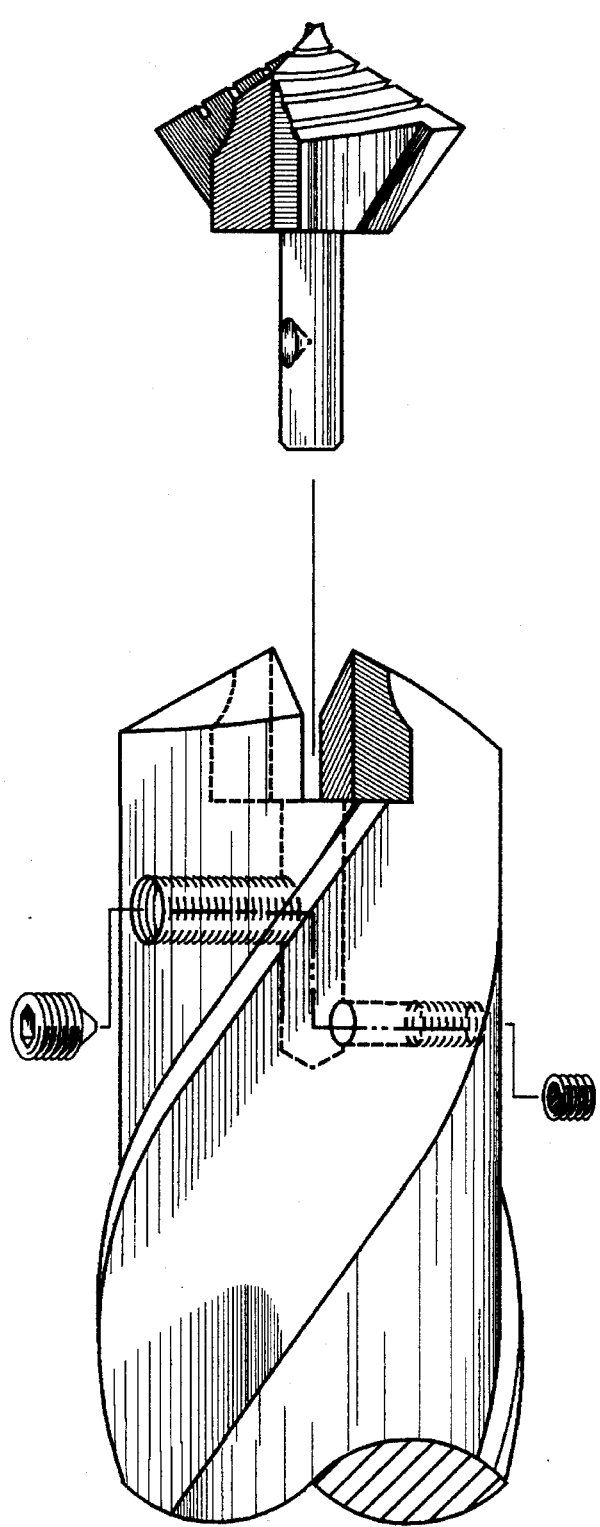
FIG. 18
FIXED INSERT WITH
TAPERED CONCAVE SWALE
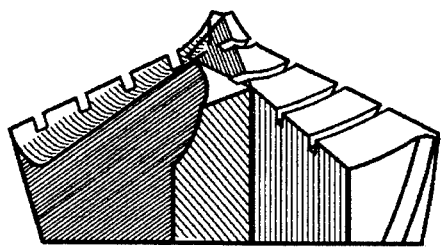

ROTARY END CUTTING TOOL

FIELD OF INVENTION

This invention pertains to a rotary end cutting tool, and more specifically to an improved twist drill bit or end mill with and without a replaceable cutting tip; constructed from any known and new drill metal-alloys, methods, and procedures.

BACKGROUND—DESCRIPTION OF THE PRIOR ART

In more Prior Art researched for a rotary end cutting tool or more commonly named twist-drill bit, twist-drill, drill bit, drill and end-mill. A broad variety of concepts and theories have been availed, with some being practical, but still possessing major problems within a drill design.

A drill 30 as seen in FIG. 1, consists primarily of a shank-end (not shown), that attaches to a power unit for rotational work, and a cylindrically long body 31. In which a plural number of helical flutes 32 of geometrical design are symmetrically machined therein beginning and extending from a shank-end running parallel to an axial center-line (now shown) throughout its length towards a conical forward-end. Comprising of a like number of geometrical lands or cutting-planes 37 formed between flutes 32 and confined between a peripheral edge of body 31 that conclude at an axis-point 35. A cutting-edge 38 is then formed at a meeting of a leading plainer wall or lead-face wall 33 of each flute 32, when body 31 is rotated in a direction of R. A chisel-point system 36 is formed at and through axis-point 35 by the adjoining divisional edge-line of each cutting-plane 37. Cutting-plane 37 being set at a negative cutting or rake-angle RA (not shown), in a direction away from cutting-edge 38, which relieves a trailing-portion of face and edge of cutting-plane 37. This creates a positive cutting or shearing feed-angle, to form a hole or slot, when employed in a work-piece material in design direction R.

Further examination of Prior Art revealed many conceptions of variable designs relative to: the number, shape, angle, and area; of a helical flute 32; chisel-point system 36; cutting-plane 37; and cutting-edge 38. Some concepts may posses greater advantages and are presently being practiced. While other concepts may be too costly to produce or maintain for their advantages if any.

The primary object of a rotary end cutting tool is to produce a precise dimensional hole or slot, or a predetermined size, that is controlled by a radial length of a cutting-edge. The precision thereof; being regulated by the centering stability of these cutting-edges revolving around and axis-point.

All Prior Art researched failed to resolve the main problems that currently inhibit the efficiency of rotary end cutting tools, and more specifically, in the larger diameter drills.

After many hours of research, testing, and observation it is my opinion, that until my present invention, the two main pernicious phenomena that inhabit a rotary end cutting tool or drill have yet to be rectified. I refer to a first phenomenon as Compound Leverage Resistance (CLR), and a second phenomenon as Side Slip Differential (SSD). I consider these two names appropriate to best describing these problems. In the forthcoming description a helical drill with a drill-end design as seen in FIG. 1 will be my reference subject.

1P. Compound Leverage Resistance (CLR) pertains more to work-piece materials as opposed to drills themselves; however, drill designs do have a direct influence on the magnitude of this phenomenon. A work-piece normally has a uniform and consistent density throughout its mass. For ease of description; I will divide this means into a compact grid-pattern using a scale of 0.0254 mm (0.001 inch)=1 square, and then naming each square a unit-of-mass with a cutting resistance value of 1r. This would demonstrate a cutting-edge 6.35 mm (0.250 inch) long would experience a cutting resistance of 250r; a 12.7 mm (0.500 inch) long would grow to 500r, and so on (these values are only an example, and not a fact).

Therefore, it is my conclusion, when a rotating drill begins to penetrate a work-piece it experiences this set resistance to cutting or shearing from these units. Beginning from the initial point of contact, and remaining throughout a drilling process. This CLR phenomenon begins to evolve as the conical-end of a drill begins to penetrate. As a contacting cutting-edge progressively grows in radial-length from penetration; these units of cutting-resistance compound rapidly. Starting right from the axis-point, and extending across the cutting-edge to a point of peripheral-contact within a work-piece.

This compounded resistance being directly applied against the integral-strength of a helical-drill-body until it overcomes a designed helix-angle. Causing the cutting-edge to momentarily lag or seize until a compounding torsional-strength, through continued rotation, overcomes this CLR resistance. As a result, the cutting-edge tears free in a spring-ahead effect, in the same direction of rotation, from this accumulated torsional-force. Resulting in the cutting-edge gouging into the work-piece at a greater advanced axial-swing location, wherein the foregoing process repeats itself, and is commonly referred to as drill-chatter or flutter.

This phenomenon exists throughout a drilling process. With the drill becoming more stable after the full conical-end, and side reamers on the drill body penetrate into a work-piece. Wherein the CLR resistance to the cutting-edge and helical-body becomes more constant; which tends to stabilize and smooth out a chattering effect.

The CLR phenomenon defined; is the cutting-resistance of a unit-of-mass multiplied by its increased radial-length, and compounded to and with the next unit-of-mass in a progressive manner. This being a collective and compounding resistance against a cutting-edge; from the axis-point to a peripheral end of a cutting-edge. Although the CLR is a linear-compounding resistance phenomenon, inherent to a rotary end cutting tool, and cannot be eliminated. It can however, be reduced or better controlled by locating the origin of a cutting-edge on or behind a straight setup-line laying between the axis-point and a peripheral-edge of the body, labeled True Radius Line (TRL).

From all Prior Art researched not one demonstrated this design; but located the origin of a cutting-edge in advance of the TRL line as illustrated in FIG. 1 thru 6. This generates a Premature side-slip or Slicing motion-of-force, extending outward along a cutting-edge towards the peripheral-arc, and thereby compounding to the CLR problem; along with the SSD phenomenon that is disclosed in the next definition.

2P. The Side Slip Differential (SSD) problem is, in my opinion, the most pernicious impairment to a rotary end cutting tool; especially in larger diameters. Side Slip is derived from the progressive dimensional-arc-growth of a linear-edge traveling around an axial-center. Starting from its axis-point with the resulting surface-speed change and distance thereof differentiated in 1 degree of rotation. By taking the circumference of one 360 degree radial-arc of a given length, using this formula (2Rπ=C), and dividing this sum by the 360 degrees in one rotation, using this formula (C÷360), you have the distance traveled per degree of rotation. Using the same formulas and procedure on a shorter radial-arc gives an answer of less value. Then subtracting this smaller sum from the first larger answer results in a difference between the two; which represents side-slip generated in one degree of radial travel; thus Side Slip Differential (SSD).

For example: "A 31.75 mm (1.25 inch) diameter Prior Art drill as seen in FIG. 14, has a 100.76 mm (3.927 inch) circumference. When divided by ONE 360 degree rotation, a distance traveled-per-degree of rotation at the periphery is 0.2769 mm (0.0109 inches). A split chisel-point consisting of 15 percent of a diameter, or a 2.38 mm (0.9375 inch) radius, calculated out; shows 0.0406 mm (0.0016 inch) distance traveled-per-degree of rotation at its peripheral-edge. Subtracting 0.0406 mm (0.0016 inch) from 0.2769 mm (0.0109 inch); would indicate a side-slip of 0.2362 mm (0.0093 inch) per degree of rotation; or a side slip distance, between the two, near equal to the peripheral-edge traveled distance."

Then adding this ordinary side-slip to or with a radial directed shear-force from rotation, combines to a compound-direction. Producing an "eddie-force" or circular-type cutting-force to the contact-point within the material. The density being a solid mass-of-unity is more resistance to shearing in a rolling or twisting fashion, (this also applies to Premature Slicing mentioned above). Thereby compounding to cutting-resistance that tends to amplify or add to both CLR and SSD problems. The Premature Slicing, mentioned in the CLR problem, tends to combine with and accelerate ordinary side-slip. With the origin of the cutting-edge being dimensionally advanced to the TRL line, (the area near the chisel-point), tends to variably-accelerate this slicing-force compounding with the SSD problem. This Premature Slicing or "eddie-force" could also be considered a Third problem to Prior Art drills. These combined phenomenons take place in every fractional dimensional-charge across a length of a cutting-edge in all Prior Art researched.

Attempts to control drill-chatter caused from the combined CLR and SSD problems using a Prior Art drill required decreasing the rake-angle RA on the cutting-plane and/or applying extreme penetrating pressure to the drill. The latter method requiring added rotational power and energy costs; while producing excessive heat. Resulting in premature dulling, chipping, or breakage to the drill; and decreased production time while sharpening or replacing thereof. Although these two (or three) phenomena are closely related, and might be considered as one problem, they are quite different. The CLR problem pertains to a multiplying-resistance to shearing that compounds against a cutting-edge rotating around an axis-point. The SSD problem pertains to the variable surface-speed difference between any two or more points of the radial-length across a cutting-edge rotating around an axis-point.

Accordingly, a minimal number of a variety of Prior Art drill-end designs, from many researched, is illustrated in FIG. 1 thru 6. In which FIG. 1 being the most common drill-end (unknown patent), with exception to flute 32 geometry, currently produced today. Wherein the centering portion being a chisel-point system 36; after finish-grinding a rake-angle RA (not shown) to each cutting-plane 37; is left with a negative cutting-angle. At a divisional line-edge of each cutting-plane 37 adjoining through axis-point 35 in regard to designed rotation R. This design, compounded by a broad residual core-area 50 thickness or diameter, allows little or no self-centering effect to occur. Moreover, this design usually requires a pilot-hole or indented-center in the work-piece, extreme pressure, and friction for penetration. Due to its negative cutting-angle feature; the chisel-point system 36 displaces or smears the material away from its path; causing difficult penetration, excessive heat, orbiting or wandering, and short drill-life. This is compounded further by cutting-edge 38 originating in advance of the TRL line; creating a Premature Slicing action that tends to push the chisel-point system 36 opposite of rotation R. Resulting in an orbital-vibration or flutter. With further penetration of the conical-end into a work-piece; the CLR and SSD problems start to take effect. Causing the drill 30 to intensify vibration and chatter in an orbital-manner until the side-cutters 46 immerse into the work-piece; and then begins to reasonably stabilize. This design can be very destructive to both drill and/or work-piece in some materials; which has inspired many new concepts attempting to rectify this problem.

FIG. 2 is a drill-end illustration of U.S. Pat. No. 4,381,162, R. Hoise, dated Apr. 26, 1983. Wherein cemented cutting-planes 37, cutting-edges 38, chisel-point system 36, and side-cutters 46 are fused into body 31 as a unit. It also possesses a thicker residual core-area 50 than seen in FIG. 1; for improved integral-strength therein. Improvements to chisel-point system 36 being split, and radiused into cutting-edge 38; tends to increase the overall length of cutting-edge 38, and projects the original of cutting-edge 38 in a greater advance of the TRL line. In my opinion; this would amplify the SSD problem, especially in larger diameters; and would tend to require greater torsional-power to rotate in a work-piece as compared to the drill in FIG. 1. Chisel-point system 36 may have fair to good centering and penetration capabilities upon initial contact however, it does not rectify the CLR and SSD problems, and appears to add to the Premature Slicing problem as well.

FIG. 3 is a drill-end illustration of U.S. Pat. No. 4,556,347, H. Barish, dated Dec. 3, 1985. Wherein the residual core-area 50 is of greater thickness and similar to FIG. 2. Having a split chisel-point system 36 provided from an extreme negative-angled plane added to the rake-angle RA (not shown) on a rear-portion of each cutting-plane 37; and cutting-edge 38 contains a dihedral-angled edge. This probably improves the centering and penetration qualities; but, still places cutting-edge 38 in advance of the TRL line. The increased length and location of cutting-edge 38 would indicate that greater torsional-power is required, as opposed to the drill in FIG. 1, and could add to both CLR and SSD problems. Test data contained in this patent reflects that drill diameters used were less than 6.35 mm (0.250 inches) with no reference provided to larger diameters being tested.

FIG. 4 is a drill-end illustration of U.S. Pat. No. 5,088,863, K. Imanaga, S. Nakamura, H. Hosono, Y. Yanase, dated Feb. 18, 1992. Wherein the residual core-area 50, and flue 32 geometry can possess a number of variables. The trailing portion of cutting-plane 37 being back-cut on a strong negative-angle; to establish the split chisel-point system 36 similar to FIG. 3. With the entire drill (not shown) being coated with one from a variety of variable metal-alloys depicted. It probably has good centering and penetrating capabilities in the chisel-point system 36 area. However, cutting-edges 38 originate in advance of the TRL line with little or no resolution to either CLR or SSD problems as well. Some concern is also directed to rotational-stability in thin work-piece materials. Test data contained in this patent implies that the largest diameter drill used was 12.5 mm (0.492 inch); which is, more-or-less, near the point where both the CLR and SSD problems start to become very apparent.

FIG. 5 is a drill-end illustration of U.S. Pat. No. 4,950, 108, A. Ross, dated Aug. 21, 1990, wherein the entire conical cutting-end 60 is a replaceable unit. Fixed to the forward-end of body 31 by counter-sunk sleeves 61, and cap-screws 62; which is aligned on body 31 by an individual center-dowel 63. This chisel-point system 36, similar to FIG. 3 and 4, is split; but, like FIG. 2 is radiused into the cutting-edge 38 far in advance of the TRL line; and is all contained in a unit-embodiment. Body 31 also contains split flushing-ports 64 in which each port angles in towards and connects to a central void or channel (not shown). That is contained in and through residual core-area 50; which terminates near the shank-end (not shown). This design appears to display the same negative disadvantages to the CLR and SSD problems as modes FIG. 2. The design of this replaceable cutting-end 60 appears to be limited in regard to minimal drill 30 diameters; and cumbersome to change while mounted in a vertical power-head. This method of fixing the cutting-end 60 to the body 31 warrants some concern to the integral-strength of this type of mounting; as well as in regards to the helix-angle used (not shown).

FIG. 6 is a drill-end illustration of U.S. Pat. No. 5,011, 342, G. Hsu, dated Apr. 30, 1991. Wherein the chisel-point system 36 being similar to those seen in FIG. 3 and 4 is split; but, at different face-angles from each other. Each cutting-plane 37 has a single groove 41 of specific dimensions and shape, being fixed on the same radial-center, on either cutting-plane 37. This split chisel-point system 36 should afford adequate centering and penetration capabilities. However, similar to FIG. 3 and 4, the intersecting point of cutting-edge 38 and chisel-point system 36 will experience compounded pressures from two directions; which tend to cause premature failure. The origin of cutting-edge 38 being in advance of the TRL line also appears to increase or magnify the Premature Slicing problem as well as CLR and SSD problems. This single groove 41 on each cutting-plane 37, being incorporated into cutting-edge 38, initially would tend to stabilize the SSD problem in a work-piece. But, after both grooves 41 are completely immersed and tracking each other would tend to add length to cutting-edge 38 producing added resistance; requiring more rotational power over initial contact with the work-piece. Consequently, the CLR and SSD problems are not rectified.

Although the aforementioned patents, among others researched, with their theories and concepts are felt to be of interest; they are not considered to be relevant.

OBJECTS AND ADVANTAGES

Accordingly, several objects and advantages of my Improved Rotary End Cutting Tool is to significantly reduce the effect of Compound Leverage Resistance, Side Slip Differential and Premature Slicing, as defined in Prior Art rotary end cutting tools.

Another object of my present invention is to improve the precision of a produced hole or slot by extremely reducing or eliminating drill-chatter occurring while working in a work-piece material, as defined in Prior Art.

Another object of my present invention is to improve the centering, and penetrating capabilities of the chisel-point while maintaining its integral shape and sharpness longer than most Prior art.

Another object of my present invention is to reduce the overall penetration, cutting-feed pressure now required of most Prior Art.

Another object of my present invention is to reduce the rotational cutting-torque now presently required in most Prior Art drills.

Another object of my present invention is to reduce overall friction, and excessive heat generated thereby, as defined in Prior Art.

Another object of my present invention is to shear work-piece materials in a compact, collective, and continual helical-shaving that reduces or eliminates plugging of the flutes now experienced in most Prior Art.

Another object of my present invention is to be more compatible to a broader variety of work-piece materials; while producing equal quality results therein; which is very limited in Prior Art.

Another object of my present invention is to perform equally efficient in all diameters of twist drills; which is very limited in most Prior Art.

Another object of my present invention is to be produced as a whole one-piece unit; and a fixed-insert cutting-unit type providing a broader variety of diameters containing all improvements thereof; that is very limited in Prior Art.

Another object of my present invention is to provide a less-expensive way to produce a superior metal-alloy drill containing all the improvements therein; which is also very limited in most Prior Art.

Another object of my present invention is to be produced as a removable insert cutting-unit type being inexpensive, conveniently simple, and easily replaceable displaying all advantages and improvements therein; which is apparently not available in most Prior Art.

Still another object of my present invention is to provide an extremely efficient cutting system having longer production life between sharpening or replacement thereof; reducing production time, inventory, and associated costs therein. Convincingly, an improved rotary end cutting tool superior to Prior Art in all aspects, and competitively proved for all the superior advantages and benefits thereof.

Further objects and advantages of the my invention will become apparent upon consideration of drawings, and ensuing descriptions.

LIST OF REFERENCE LETTERS AND NUMBERS

L1 to L5 used i groove lay-out.
Drill—(non-insert)
300a Insert-Drill—assembled
31 Body, 31a insert-holding body
32 Flute (in general)
33 flute Lead-face wall
34 flute Lag-face wall
35 Axis-point
36, 36a, 36b—System-, Chisel-point
37a, 37b Cutting-plane
38a, 38b Cutting-edge
39a to 39e Zone-cutting edge
40a to 40e Zone-cutting edge
41 Grooves—variable number
42 groove-Path—tracking
43 groove-Width
44 groove Void-area—volume
45 Support-step partition
46a, 46b Side-cutter 47 Insert cutting-unit
48 Center-locking dowel
50 Residual core-area
52 Plug-screw means
54 Threaded-hole means
56a, 56b Thrust-face wall—body
58 Receiver-face—body
60 Cutting-end
62 Cap-screws
64 Flushing-port
65 Circular-void
A to J reserved for drawings
BA Back-angle plane
BW Base-Width—insert unit
DD Dowel-Diameter
DL Dowel-Length
FA Face-Angle
FD Main flute-Depth
HA Helix-Angle
IA Incurvate-Angle plane IL Insert Length
MA area-angle—flute
PA Pitch-Angle—insert
PD Point-end Depth—Flute
PM Peripheral-surface-Margin—body
PW Peripheral-edge Width
RA Rake-Angle
SA Support-Angle
TA Taper-Angle—flute
TD Taper-Distance—flute
TRL True Radius Line setup-line/plane
49 dowel Receptacle-hole
51 Clean-out/Extraction hole
53 Locking set-screw means
55a, 55b Thrust-face wall—insert
SF Secondary Face-plane—55ab, 56ab
57 Bottom-face—insert unit
59 Tapered concave swale
61 Sleeves
63 Individual center-dowel

TABLE 1

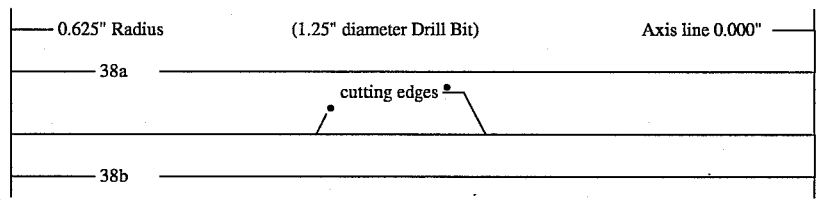

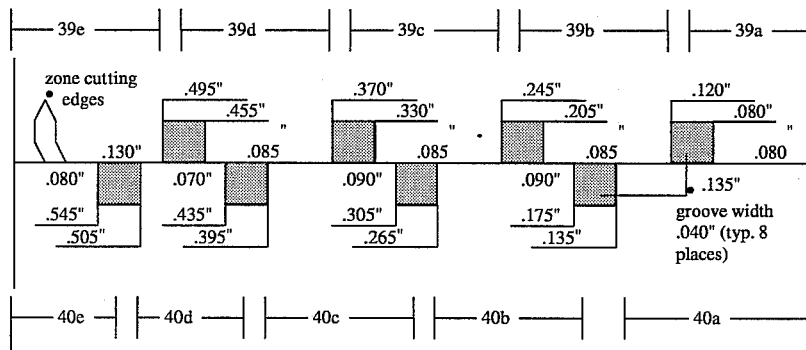

Comparison Chart - between Prior Art and Improved Rotary End Cutting Tool -

| | | | Zone | | | | |
|---|---|---|---|---|---|---|---|
| | 1 | 2 | 3 | 4 | 5 | 6 | 7 |
| cutting edge | Outside Radius | 1 Rev = C Full Dia. | Travel per degree/R | Inside Radius | 1 Rev = C Full Dia. | Travel per degree/R | Difference colm 3–6 |
| 40e | .625 | 3.927 | .0109 | .545 | 3.424 | .0095 | .0014 |
| 40d | .505 | 3.173 | .0088 | .435 | 2.733 | .0076 | .0012 |
| 40c | .395 | 2.482 | .0069 | .305 | 1.916 | .0053 | .0016 |
| 40b | .265 | 1.665 | .0046 | .175 | 1.100 | .0030 | .0016 |
| 40a | .135 | 0.848 | .0024 | .000 | 0.000 | .0000 | .0024 |
| Over all averages for zone edges 40a to 40e = side-slip per degree of rotary travel . . . | | | | | | | .00164 |
| 39e | .625 | 3.927 | .0109 | .495 | 3.110 | .0086 | .0023 |
| 39d | .455 | 2.859 | .0079 | .370 | 2.325 | .0065 | .0014 |
| 39c | .330 | 2.074 | .0058 | .245 | 1.539 | .0043 | .0015 |
| 39b | .205 | 1.288 | .0036 | .120 | 0.754 | .0021 | .0015 |
| 39a | .080 | 0.503 | .0014 | .000 | 0.000 | .0000 | .0014 |
| Over all averages for zone edges 39a to 39e = side-slip per degree of rotary travel . . . | | | | | | | .00162 |
| cutting edge | | - Prior Art Drill - | | | | Sum total average . . . | .00163 |

TABLE 1-continued

| | | | | | | | | |
|---|---|---|---|---|---|---|---|---|
| 38a | .625 | 3.927 | .0109 | .000 | — | — | | .0109 |
| 38b | .625 | 3.927 | .0109 | .000 | — | — | | .0109 |
| Over all average and Sum total average for cutting edges 38a and 38b = the same . . . | | | | | | | | .0109 |

NOTES: C = circumference, R = rotation

Summary Conclusion: Side-slip of prior art_.0109, divided by side-slip of my Improved Rotary End Cutting Tool_.00163; demonstrates 6.69 times less side-slip over prior art on this one example of a 1.25" diameter drill. Second Advantage: Groove width used on my Test Drill was .040" each, with a sum total of 8. Multiplying .040" times 8 equals .320", then subtracting this from 1.25", results in a net cutting contact length of .930", or 25.6 percent less surface contact over prior art, for the same diameter hole. Which translates to 25.6 percent less cutting resistance, heat, and rotary power required. Providing longer production with less maintenance, and associated costs, over prior art.

DESCRIPTION OF DRAWINGS

FIG. 14 is a forward-end view of a twist-drill in accordance with another embodiment of my invention.

FIG. 14A is a section view of drill in FIG. 14 displaying a side elevation of the cutting insert as viewed from the direction of arrows 14A in FIG. 14.

FIG. 15 is a side elevation of the drill in FIG. 14 as viewed from the direction indicated by arrows 15 in FIG. 14.

FIG. 15A is a top view of the forward-end of the drill in FIG. 15, with the cutting insert removed, in relation to arrows 15A in FIG. 15.

FIG. 15B is a cross sectional view of the drill in FIG. 15, as seen from the direction of arrows 15B depicting the location of the set-screw in relation to the helical-angle of the drill-body.

FIG. 16 is an exploded view of Removable-Version Insert Drill of FIG. 15;

FIG. 17 is a full side elevation of Removable-Insert Unit of FIG. 16;

FIG. 18 is a side elevation of the Fixed-Version Insert Cutting Unit of FIG. 16.

DISCLOSURE—PREFERRED EMBODIMENTS OF THE INVENTION

Figure 1:
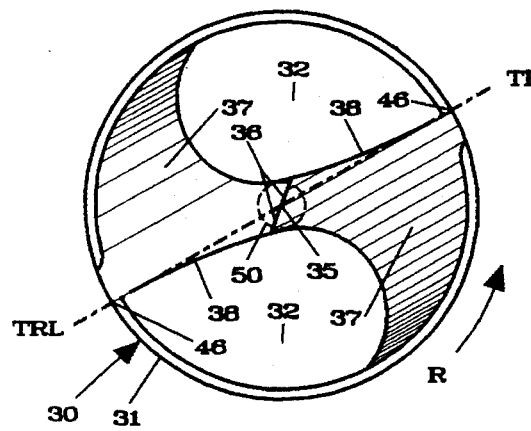
FIG. 1 is a forward-end view of the most common Prior Art twist-drill design currently being produced and marketed.
Figure 2:
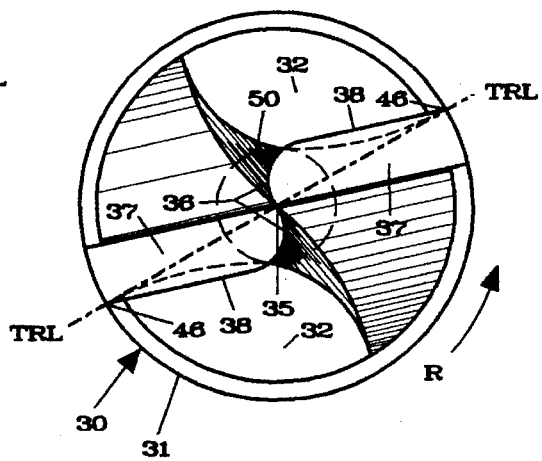
FIG. 2 is a forward-end view of a Prior Art twist-drill with cemented cutting parts, reference U.S. Pat. No. 4,381,162, R. Hosoi, dated Apr. 26, 1983.
Figure 3:
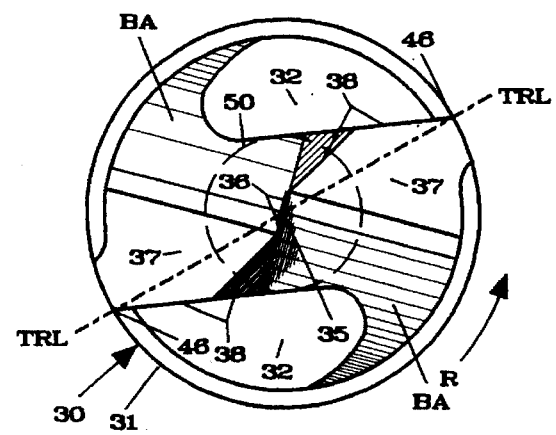
FIG. 3 is a forward-end view of a Prior Art twist-drill that possesses dihedral-angled cutting-edges, reference U.S. Pat. No. 4,556,347, H. Barish, dated Dec. 3, 1985.
Figure 4:
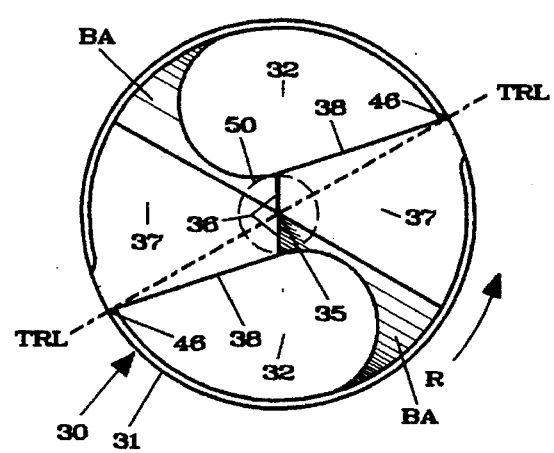
FIG. 4 is a forward-end view of a Prior Art twist-drill possessing a split point chisel, and alloy coatings, reference U.S. Pat. No. 5,088,863, K. Imanaga, S. Nakamur, H. Hosono, Y. Yanase, dated Feb. 18, 1992.

Before starting, I will define True Radius Line which is referred to quite frequently throughout this application, (hereinafter referred to as setup-line TRL). In which is a phantom setup-line (or plane if applicable) use to illustrate and locate the improvements in the drill-body. Although depicted in the ongoing drawings as a bisecting line; it is a straight-line between the center-line (or point) and peripheral-edge of the body. Which can be used on three or more fluted drills and end-mills as well, and is not to be construed limited as displayed. Another definition to resolve in common bonding point; which is a precise connecting-point on the setup-line TRL used to arrange the improvements therein. With both being essential in development of my Improved Rotary End Cutting Tool, and although not a material element, is none-the-less equally the same-importance thereof.

For ease of understanding all improvements of the embodiments of my Improved Rotary End Cutting Tool; caused by its unique design, theories, and abandonment from most common Prior Art practices. The obvious attributes containing the improvements is described first as a whole. Subsequently each improvement, advantage and benefit thereof, is isolated and defined in complete detail following each disclosure.

Refer now to FIG. 7 thru 10, which illustrate in accordance with an embodiment of my Improved Rotary End Cutting Tool, (hereinafter will be referred to as twist-drill or drill 30). A drill 30 composed of two main portions of which the first is a shank-end (not shown); used to accommodate attachment in a rotary power-tool unit for rotational work. The second portion is a cylindrically-long body 31 having a plural number of a geometrically designed chip-extracting flutes 32. Being composed of a lead-face wall 33 and a lag-face wall 34 that impose their unique feature into body 31 respectfully to provide a predetermined to volumetric-area therein. In which being symmetrically machined in a helical-pattern using a predetermined helix-angle HA therein. Flute 32 originates from a predetermined-point near the shank-end at a predetermined-depth running parallel to an axial center-line (not shown), towards a predetermined conical-angled forward-end having an axis-point 35 being an extreme end-point of center-line therein.

Figure 8:
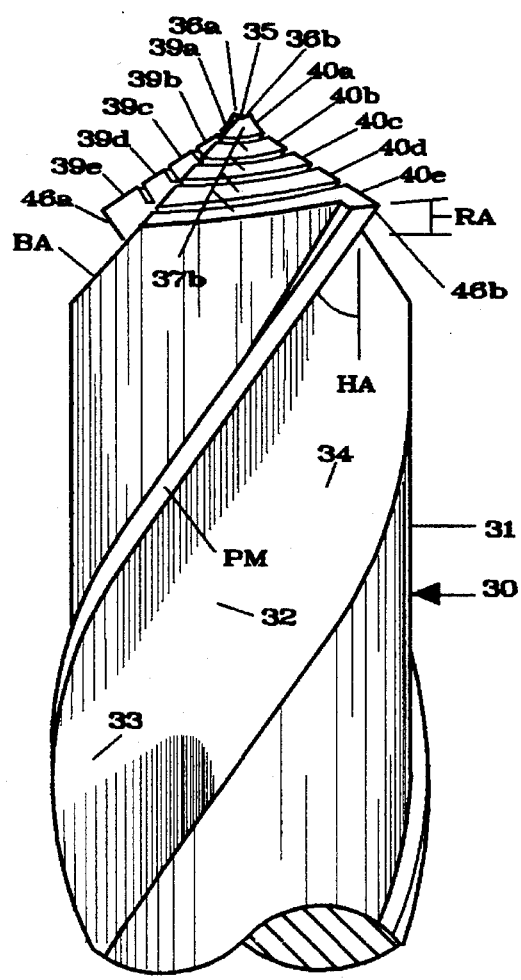
FIG. 8 is a side elevation of the drill in FIG. 7 as seen from the direction indicated by the arrows 8 in FIG. 7.
Figure 10:
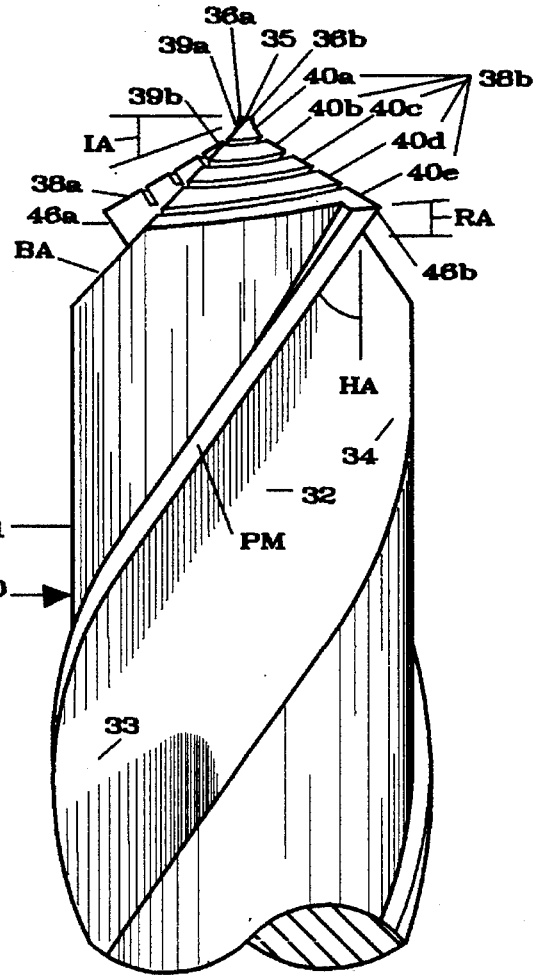
FIG. 10 is a side elevation of the drill in FIG. 9 as seen from the direction of the arrows 10 in FIG. 9.

Flutes 32 of a plural number further divide an appearance of body 31 into a long helical-striated body 31 of plural-portions. Whereon further relief or contour machining, using a predetermined depth, design on each portion thereof a remaining leading peripheral-surface margin PM supporting a side-reamer or side-cutter 46a, 46b. The machined depth of each opposing flute 32 into body 31 establishes a residual core-area 50 that influences integral-strength and rigidity in body 31 from the shank-end to axis-point 35 in conical forward-end. This forward-end also being an end-point of body 31 that transforms into a conforming-number of a geometrical-shaped land or cutting-plane 37a, 37b between plural flutes 32. When rotated in a designed direction of R an incurvate cutting-edge 38a, 38b is formed at a junction of cutting-plane 37a, 37b with incurvate lead-face wall 33 of flute 32. With a sharpness thereof normally being influenced by helix-angle HA used in flute 32. In which helix-angle HA, as seen in FIG. 8 and 10, of flute 32 can be a variable-angle depending on a design-application of drill 30. A preferred-angle being under 50 degrees from an extended-plane of axial center-line of drill 30 therein.

Figure 12:
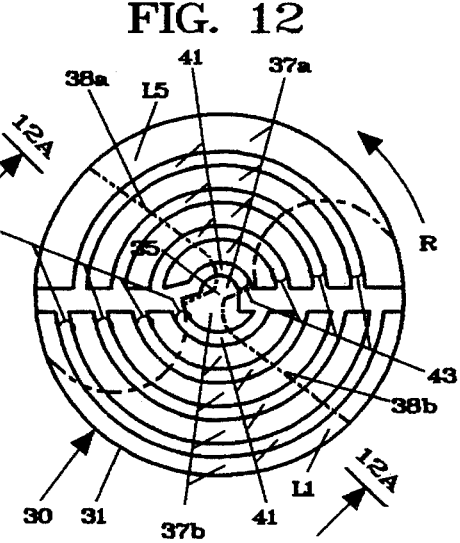
FIG. 12 is a forward-end view of a twist-drill blank in accordance with another embodiment of my invention.
Figure 12A:
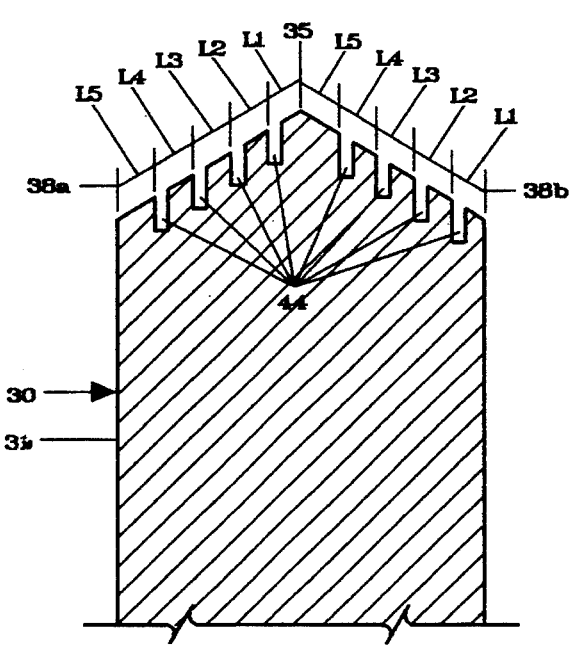
FIG. 12A is a section view of FIG. 12 as viewed from the direction of arrows 12A in FIG. 12.

A cutting feed-angle into a work-piece is regulated by a rake-angle RA machined to cutting-plane 37a, 37b; descending in an opposite direction from cutting-edge 38a, 38b using a predetermined negative-angle directed away from a work-piece surface. In which rake-angle RA applied on each cutting-plane 37a, 37b also contains a variable incurvate-angle plane IA that starts from a peripheral edge-plane of cutting-plane 37a, 37b, and increases the negative-angle to plane thereon as it extends towards axis-point 35. This rake-angle RA on cutting-plane 37a, 37b further forms a divisional edge-line of contradicting angles adjoining through axis-point 35. With a length thereof being regulated by a thickness of residual core-area 50 and known as a chisel-point system 36 area; which also completely individualizes each cutting-plane 37a, 37b. To transform this edge-line of contradicting angles to a positive-angled cutting-edge, and provide a split chisel-point 36a, 36b. A further machining process is performed which also reduces the mass-area of cutting-plane 37a, 37b. Wherein a descending-placated or back-angle plane BA is cut to a rear portion-area of cutting-plane 37b starting near axis-point 35. It being positioned to infringe a forward-portion of divisional edge-line of cutting-plane 37a; then cut to end of cutting-plane 37b at a predetermined-angle towards the shank-end; at a predetermined radial-angle set from a setup-line TRL thereon. This being labeled True Radius Line which is an essential setup-line TRL involved impart therein, and impart for arrangement of incurvate lead-face wall 33 in body 31. The descending-angle used in back-angle plane BA is a greater predetermined negative-angle than used in rake-angle RA. With this overall procedure being sequentially provided plurally therein. By using back-angle plane BA provides a split-point and aggressive-cutting edge-angle to chisel-point 36a, 36b. It also eliminates interference to superlatively designed incurvate cutting-edge 38a, 38b; when body 31 is rotated in direction of R. However, depending on an application factor, and a diameter of body 312; this back-angle plane BA can be omitted. Using only rake-angle RA containing incurvate-angle plane IA to allow more peripheral-contact surface-area within a work-piece. Such that would be used in Plastics or marginally-thin work-piece materials. The ensuing improvements along with their advantages and benefits will now be disclosed as follows:

1M. Refer now to FIG. 7, 9, 12, 14 and 15 which illustrate in accordance with a first improvement of my Improved Rotary End Cutting Tool. Whereon cutting-plane 37a, 37b is orchestrated with a multiple count of typical-purposed volumetric grooves 41. Systematically and Methodically arranged between axis-point 35, and a peripheral-edge of body 31 using a predetermined radial step-distance from axis-point 35 on each cutting-plane 37a, 37b thereon. The multiple-number thereof, and groove-width 43 being directly influenced by a diameter, number of cutting-planes 37 designed in body 31, and a calculation procedure impart thereby, and impart to determine the Slide Slip differential (SSD) thereon. Refer now to FIG. 12, 12A and Table 1. In which multiple grooves 41 in cutting-plane 37a are spaced as near equal width or distance apart. This is determined by a theoretical calculation impart to reduce a physical cutting-surface-area of drill 30 by up to 40 percent, and still produce a prescribed diameter thereof. And impart to confine a side-slip difference ranging from 0.0254 to 0.1524 mm (0.001 to 0.006 inch) on each remaining portioned-plane between grooves 41 thereon. In which determines an appropriate number of groove-widths' 43 and edges' a combined cutting-edge 38a, 38b can support without annulling benefits thereof.

A first step is to divide the purposed reduced-percentage-sum by a predetermined typical grove-width 43 to result number of grooves 41 in a diameter. First trying to arrive at a even number to divide on each cutting-plane 37a, 37b; which, as stated, is directly influenced by diameter, and groove-width 433 used thereof. After which, a second step is adding a predetermined safe-edge margin, used from a peripheral-edge of body 31, with a groove-width 43 value and a predetermined groove-clearing-margin, that is a radial-clearance between opposing outside groove-width 43 in cutting-plane 37a, 37b, with sum thereof shown in L5. Further adding this sum to a predetermined safe-edge margin and groove-width 43 that is used from axis-point 35, and shown as L1. Step three is subtracting this combined-sum from the radius of cutting-plane 37a thereof. Step four is dividing that derived-sum by remaining number (3) of grooves 41 to result a near-equal distance between each thereof, including a groove-width 43, and shown as L2, L3, L4. Step five is to reverse ends of this lay-out and apply it to cutting-plane 37b; transposing peripheral-edge-dimension L5 from axis-point 35, and axis-point-dimension L1 from the peripheral-edge thereof. This inboard parameter on cutting plane 37b can be proportionally divided to better adjust remaining grooves 41 contained in L2, L3, L4 to near center between opposing grooves 41 contained in cutting-plane 37a; as illustrated in FIG. 8, 12, 12A, and defined in Table 2.

Accordingly, providing each groove 41 therein an individual radial groove-path 42 from axis-point 35 (FIG. 9) to avoid infringing any-part of a fractional-area of another groove-width 43 when rotated in designed direction R. A depth of groove-void 44 (FIG. 12A) can be a variable having a minimum being two and one-half times a predetermined cutting-feed-rate or rake-angle RA. The maximum being only restricted by integral-strength of drill 30; and machining capability thereon. Distance between axis-point 35 and an inside-edge of nearest groove-width 43 (zone-cutting edge 39a in FIG. 7, 9) in cutting-plane 37a can be a variable distance directly influenced by diameter and integral-strength of chisel-point system 36. This close groove 41 to axis-point 35 in cutting-plane 37a could be omitted if the integral-strength of zone-cutting edge 39a and chisel-point system 36 was diminished. Creating less grooves 41 in cutting-plane 37a than in cutting-plane 37b; without impairing shearing-performance of drill 30. This would however, require modifying the above described lay-out process accordingly in doing so.

Figure 7:
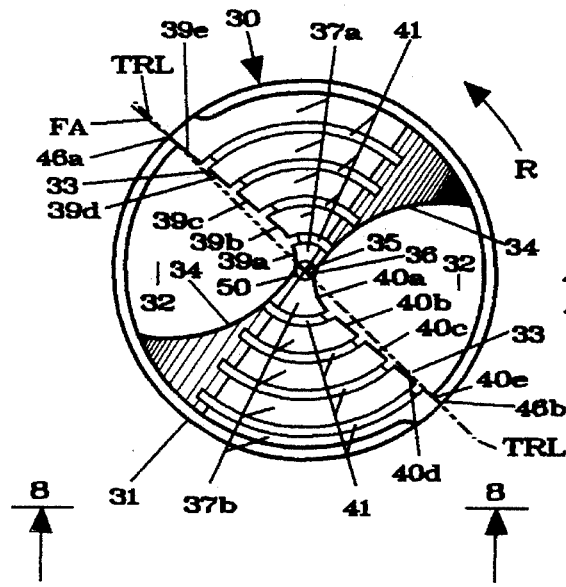
FIG. 7 is a forward-end view of a twist-drill in accordance with an embodiment of my invention.

Distance between peripheral-edge of body 31 and outside-edge of nearest groove 41 (zone-cutting edge 40e in FIG. 7, 9) is mainly determined by the reversed-layout, SSD calculations, and radial-length of cutting-edge 38b. With a minimum being regulated by integral-strength of side-cutter 46b, and a maximum being determined by radial-alignment of opposing groove 41 and required groove-clearing-margin contained in L5 on cutting-edge 38a (FIG. 12). All grooves 41 are fixed in cutting-plane 37a, 37b on-or-near a true radial-arc of individual dimensions. When employed in a work-piece in direction of R; groove-paths' 42 of an uncut material-ridge deployed from all groove-width 43 in cutting-edge 38a would be sheared-off with shavings produced by cutting-edge 38b (FIG. 9); with the reverse sequence being the same thereof. The resulting advantages and benefits from multiple typical-purposed grooves 41 in cutting-plane 37a, 37b and their arrangement therein will be defined as follows:

1A. A first advantage in unique cutting-edge 38a, 38b. Cutting-plane 37a after being intersected by a multiple of grooves 41 transforms single cutting-edge 38a into a group of five zone-cutting edge 39a to 39e; as illustrated in FIG. 7, 8, 14, 15 and depicted in Table 1. The reversed lay-out process applied to cutting plane 37b provides zone-cutting edge 40a to 40e; resulting in each being different from the other. Moreover, zone-cutting edge 39a to 39e, and 40a to 40e possesses a unique individual cutting parameter, CLR problem, and SSD problem. With neither of two being alike, and each having a much less problem-value thereof; than what would be calculated for entire single cutting-edge 38a, 38b; as defined in Prior Art (pages 2–5, CLR, SSD description); providing the following benefits:

1b. With the conical-end of a rotating drill 30 completely employed in a work-piece; total SSD for cutting-edge 38a, 38b transforms to the fractional overall average of zone-cutting edges' 39a to 39e, and 40a to 40e. This occurs from all zone-cutting edges' 39a to 39e and 40a to 40e cutting in unison; with the SSD and shearing-force of each therein being contained simultaneously between groves 41. This can reduce near seven-times less the as-for described side-slip (SSD) producing "eddie-force" exerted against a solid, stable work-piece material; over that generated by an entire single cutting-edge 38a, 38b.

2b. This also provides better control to the CLR problem as well; by interrupting the compounding resistance effect in the over all drilling-process being limited to the parameters confined by grooves 41 thereof.

3b. By nearly eliminating the SSD problem, and excessive friction in the shearing-process; allows drill 30 to remain extremely stable; thereby, eliminating "drill-chatter" as experienced in most Prior Art.

4b. This also provides shearing to be confined in a more singular radial-direction. Which reduces cutting-resistance, heat generated thereby, rotational power required, and excessive wear to the rotary power-tool to a minimum.

5b. In conjunction to extending sharpness of zone-cutting edge 39a to 39e, 40a to 40e; and longer production time thereof. The above procedure works in unity; from the point of initial-contact of the chisel-point system 36; to complete employment of body 31; to full penetration through the work-piece.

2A. The second advantages is unique zone-cutting edge 39a to 39e, and 40a to 40e. Wherein each having a defined "distance per degree of travel" or shearing-speed, from the other, within the confines of their parameters. Each of which possesses a fractional forward-travel difference between the inside and outside peripheral-arc therein; which reduces the SSD problem to a minimum thereof. This reduces compounded-tensions produced within the shaving allowing it to remain whole and continual in a helical-form; rather than producing flute 32 plugging fragments or chips, providing the following benefits:

6b. The shavings produced from each zone-cutting edge 39a to 39e, and 40a to 40e is continuous and helical; but of different radial diameters. This being caused impart by incurvate cutting-edge 38a, 38b, helix-angle HA, variable incurvate-angle plane IA in rake-angle RA, and rotational cutting-speed difference of each thereof. Totally influenced by the location of each shaving within the radial-arc of cutting-edge 38a, 38b and minimal side-slip (SSD) contained thereon. Refer now to FIG. 7 to follow referred to components. Starting at zone-cutting edge 39a closest to axis-point 35, and having the slowest radial speed; produces a thick open-helical shaving of continual length displaying a small diameter. Whereas, zone-cutting edge 39b possesses a faster radial-speed, and produces a thinner continual shaving with a more compact-helical and larger diameter; that overlays the shaving produced from zone-cutting edge 39a. The shaving produced from zone-cutting edge 39c, 39d, and 39e progress in this same manner. To produce a single compact-bundle of shavings that spiral out of flue 32 without binding or plugging. The same process is repeated from zone-cutting edge 40a to 40e; that produce two continual compact-bundles of shavings until drilling is interrupted or completed.

3A. The third advantage is multiple-purposed groove-width 43. Under working practice, each groove-width 43 provides a rail of uncut-material in a work-piece surface. This assembly of rails is continually in total-contact with both side-walls of each grove-width 43 therein; providing the following benefit:

7b. This phenomenon transforms each deposit thereof into a stabilizing guide-rail, whereby assembled together forming a type of inter-locking rail-system minimizing side movement. Which tend to mandate the axial-rotation of drill 30 to remain centered in the work-piece. This rail-system becoming apparent as the conical-end of a working drill 30 begins deploying these guide-rails as it penetrates into a work-piece. Then again, when further drilling through a marginally-thin material having axis-point 35 exited prior to full employment of the conical-end. Which overall, further reduces or combats the effects of any remaining CLR and SSD problem thereof.

4A. The forth advantage is purposed groove void-area 44 containing a mandated volumetric-area. All groove void-area 44 in cutting-edge 38a on cutting-plane 37a purposely contain a greater volume-area than the remaining uncut-rail volume-area of the work-piece. Further being located in a path near the center of a following zone-cutting edge 40a to 40 e in cutting-edge 38b provide the following benefits:

8b. A uniform and even distribution system for flushing and cooling zone-cutting edge 40a to 40e therein. The same process being experienced in the reverse sequence as well. This enables the entire-area within the confines of drill 30 to be more evenly-vented across the cutting contact-surfaces in a work-piece material.

9b. Resulting in reducing heat caused from friction, and providing lubrication to all surfaces therein. Thereby, affording extended sharpness and work-time to zone-cutting edge 39a to 39e, and 40a to 40e. Resulting in a smoother-finish, and a more-precisioned hole or slot in the work-piece.

2M. Refer now to FIG. 7, 9, 11, and 14 which illustrate a second improvement of my Improved Rotary End Cutting Tool which is a First-part Improved Flue Geometry. Impart being incurvate lead-face wall 33 of flue 32 deploying its unique features in body 31. In which lead-face wall 33 comprised of a variable-curve merged with a near flat-face plane that occupies a majority of length thereof. And arranged in body 31 by a variable face-angle FA applied to flat-face plan that can swing or adjust from in-line with setup-line TRL to a predetermined negative-angle direction opposite rotation R; as viewed from a peripheral-edge point thereon. With face-angle FA being radial-set from setup-line TRL extended between axis-point 35 and that predetermined peripheral-edge point on body 31. Flat-face plane then blends with a merged variable-curve ending at a common bonding-point located on setup-line TRL at a predetermined distance from axis-point 35. This variable-curve confined within a remaining limited-length thereof is influenced to adjust accordingly by a determined face-angle FA used; as viewed in comparing FIG. 7 to FIG. 9.

Figure 9:
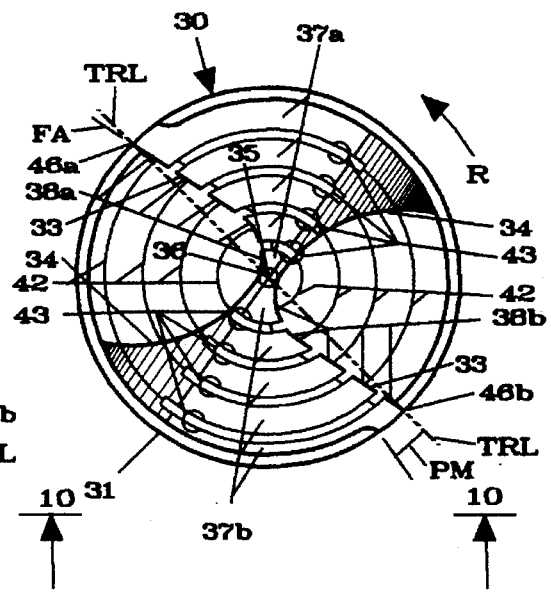
FIG. 9 is a forward-end view of a twist-drill in accordance with another embodiment of my invention.
Figure 13A:
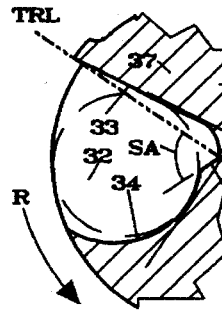
FIG. 13a to 13d are illustrations of different flute geometric designs, among others, that can be employed in the embodiment of my invention.
Figure 13B:
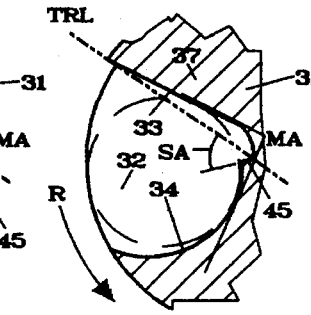
Figure 13C:
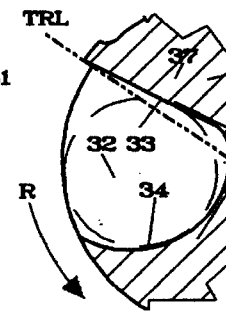
Figure 13D:
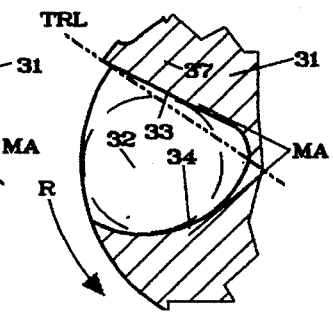

This face-angle FA also influences a variable penetrating distance to chisel-point 36a, 36b, and a cutting-angle to zone-cutting edge 39a, 40a as viewed in comparing FIG. 8 to FIG. 10. In which lead-face wall 33 is then synthesized with a lag-face wall 34 at the common bonding-point to conclude a predetermined chip-extracting volumetric-area in flute 32 thereof. In which lag-face wall 34 is a predetermined, smooth, gradual, composite of dissimilar correlated arc-lines' forming a Compounded-curve to form a chip-extracting volumetric-area in body 31, as viewed in FIG. 13A thru 13D. In which a predetermined flute-area angle MA, in relation to lead-face wall 33, is of less angle when comparing it to an alternate flute-area angle MA as seen in FIG. 13C. Demonstrating the flexibility of flute-area angle MA that can be employed in lag-face wall 34. With the advantages and benefits from the incurvate lead-face wall 33 as follows:

5A. A fifth advantage is a combined variable face-angle FA set to a near flat-face in lead-face wall 33 transposing its unique feature therein. By locating cutting-edge 38a, 38b on-or-behind setup-line TRL provides each groove 41 in cutting-plane 37a, 37b and zone-cutting edge 39b to 39e, 40b to 40e a more advantaged radial-alignment when contacting a work-piece surface in a shearing action. Being more compatible with the varying surface-speed change between axis-point 35 and side-cutter 46a, 46b thereof. The cutting-force is unified in a more conforming radical-arc direction providing a more direct-angle to shearing for zone-cutting edge 39b to 39e and 40b to 40e. Which better controls the remaining SSD problem between inside/outside parameters therein; and in addition, non-serving edge-dulling heat generated from side-slip friction thereof. In which a negative face-angle FA as seen in FIG. 7 set to the near flat-face plane in lead-face wall 33; results the merged variable-curve therein to adjust accordingly as viewed. Whereas, a more negative face-angle FA provides a more pronounced adjustment thereof as viewed in FIG. 9. This variable-curve combined with a minimal core-area 50 at axis-point 35; provides zone-cutting edge 39a and 40a to be more transitioned into chisel-point 36a and 36b demonstrating the following benefits:

10b. A more direct-angle to shearing effect to zone-cutting edge 39a, 40a when drill 30 is rotated in direction of R. This tends to reduce "Premature Slicing" that relates to the "origins" of zone-cutting edge 39a, 40a as defined in Prior Art (see page 5). This unique design also effects better control of Compound Leverage Resistance (CLR) problem as well.

11b. This provides excellent centering and penetration to combined chisel point 36a, 36b/ curved zone-cutting edge 39a, 40a in a more direct radical-arc direction around axis-point 35.

12b. Resulting in a definite conical-shaped penetration that provides a very stable centering-effect to drill 30 rotation. In which a more negative face-angle FA, as seen in FIG. 9, set to lead-face wall 33; provides a more pronounced penetrating-projection as seen in comparing FIG. 10 to FIG. 8; before zone-cutting edge 39b and 40b contact the work-piece surface. This resulting a deeper and more stable conical-shaped centering pilot-hole before entry of zone-cutting edge 39b to 39e and 40b to 40e therein.

13b. By providing a better adjusted angle-to-shearing-speed to all zone-cutting edges' 39a to 39e and 40a to 40e; tends to contain and unify all cutting-force in a more straight-forward direction. This near-eliminates all remaining Slicing and SSD problem, and in addition with all other described advantages/ benefits, eliminates "drill-chatter" and "orbiting."

14b. Which provides a very stable drill 30, and "self-starting" chisel-point system 36 required no pre-arranged "pilot hole" or "centering index" in the work-piece; regardless of drill 30 diameter involved.

15b. This further providing each groove-width 43 contained in cutting-edge 38a, 38b to deploy guide rails in a near-true radial-arc as drill 30 is employed in a work-piece surface; resulting in added rotational-centering stability that has demonstrated being very beneficial in marginally-thin materials.

3M. Refer not to FIG. 7, 9, 10, 12A, and 14 that illustrate a third improvement of my Improved Rotary End Cutting Tool which is a Reduced-surface Cutting-edge 38a, 38b while still providing a prescribed diameter thereof. Zone-cutting edge 39a to 39e, and 40a to 40e when employed in a work-piece material now experience basicly a direct forward-contact to shearing-resistance from rotation. All grooves 41 in cutting-edge 38a, 38b being typical and a purposed volumetric void-area 44; decrease contact-area and resistance by the combined total-area from all groove-width 43 thereon. Each groove-void 44 thereof deploys a rail-area of uncut-material having a dimensional equal to a groove-width 43. And a height near-or-equal to a cutting-feed depth of groove-void 44. Although total-area within drill 30 periphery is sheared and extracted per revulsion; this reduction does exist as depicted in Table 1. It might appear this rail mass-area combined to an equal mass-area in a new uncut-shaving would cancel any advantages caused from all multiple groove-width 43 therein. But, as zone-cutting edge 39a to 39e, 40a to 40e shear the material at a designed feed-rate, with a rail attached thereon, a different force or phenomenon occurs with the following advantages and benefits:

6A. A sixth advantage is Reducing Cutting-feed Pressure. The mass-area of the rail on top of shaving tends to effect a downward pressure of unknown magnitude that tends to continue to penetration-pressure as opposed to cutting-resistance. Primarily being caused from cutting-action originating at a cutting-feed distance under this rail which appears to act as a cutting-flange on top of that shaving. This causing additional downward pressure from a helix-angled HA face of cutting-edge 38a, 38b being subjected to rotary-pressure and leverage-contact thereof in a shearing action. Thereby reducing mandated feed-pressure providing the following benefits:

16b. It would then be apparent that if cutting-area was reduced so would cutting-resistant. This results from rails' deployed by all groove-width 43 in cutting-edge 38a only existing for 180 degrees of rotational. Then being sheared off by zone-cutting edge 40a to 40e on cutting-edge 38b. New rails' are then deployed in a different radial-offset position by all grove-width 43 on cutting-edge 38b. In which are then sheared off in the completing 180 degrees of that same rotation by zone-cutting edge 39a to 39e on cutting-edge 38a; which overall, is seuqentially on going to end of drilling thereof.

17b. This sequence results in all rails' constantly remaining near a thickness of a cutting-feed-rate, or rake-angle RA, and never bottoming in the groove void-area 44; which would add cutting-area in doing so. Which overall illustrates reduced cutting-resistance, and less feed-pressure required thereof.

7A. A seventh advantages is Reducing Overall Cutting-area within a determined diameter of a drill 30. Depending on diameter of drill 30, total number of grooves 41, and groove-width 43 thereof. Total cutting-contact-length of cutting-edge 38a, 38b can be decreased up to 40 percent less from employing grooves 41. Over same cutting-edge 38a, 38b without grooves 41; as exampled in Table 1; providing the following benefits:

18b. By reducing total-cutting contact-length of cutting-edge 38a, 38b up to 40 percent; has demonstrated an ability to drill larger holes using less rotary power. This benefit was proven in one of many tests conducted in developing this Improved Drill 30. "In which a 38.1 mm (1½]inch) diameter step-shank drill 30 containing (8) 1.905 mm (¾) diameter drill 30; being set at (slowest) 195 RPM rotary speed. In which Improved drill 30 was tested by drilling through a 25.4 mm (1 inch) thick mild-steel plate several times. Whereas, using a same-diameter Prior Art drill 30 as seen in FIG. 1; in the same setup drill-press; would stop the machine and drilling process thereof. With the latter being tried several times without producing a completed hole. In fact: using a 25.4 mm (1 inch) diameter Prior Art drill 30 would also stop the same setup drill-press, if the same feed-rate used on my Improved drill 30, was applied thereon."

19b. This would allow individuals' now owning a small horse powered drill-press; to upgrade their drilling capacities without the need and expense of purchasing a larger horse powered drill-press to do so thereof.

Figure 11:
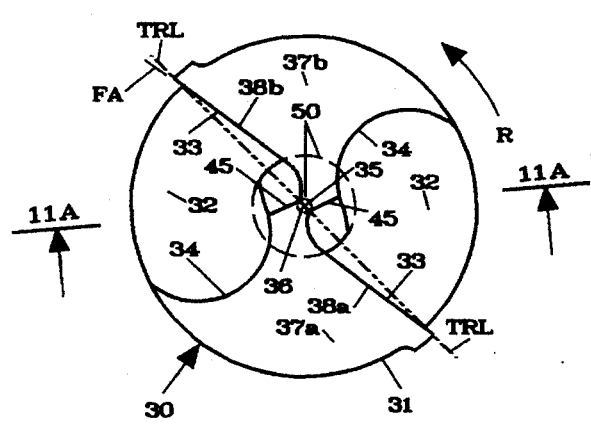
FIG. 11 is a forward-end view of a twist-drill in accordance with another embodiment of my invention.
Figure 11A:
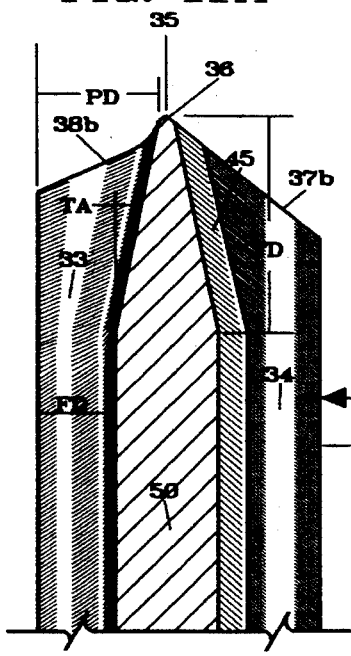
FIG. 11A is a side sectional elevation of the drill in FIG. 11 as viewed from the direction of arrows 11A in FIG. 11.

4M. Refer now to FIG. 11A which illustrates a fourth improvement of an embodiment of my Improved Rotary End Cutting Tool which is a Tapered Residual Core-area 50. Resulting from a taper-angle TA designed to flue 32 at a conical forward-end of body 31. FIG. 11A which omits the helix-angle HA for clarity and illustrates a variable designed flute-depth of flute 32 into body 31. Starting first at a point-end depth PD near axis-point 35; which can be a variable distance up to 49 percent of drill 30 diameter. A combined predetermined taper-distance TD and a predetermined main flute-depth FD determines a flute taper-depth TA. In which taper-distance TD can range up to 100 percent, and main flute-depth FD up to 40 percent of a diameter of body 31 thereof. After tape-distance TD has been set; main flute-depth FD becomes constant from this angle-point, remaining parallel to an axial center-line therein, to a predetermined terminating-point near the shank-end (not shown). By tapering residual core-area 50 near axis-point 35 provides the following advantages and benefits:

8A. An eighth advantages is Complete Penetration Control of the conical forward-end resulting from tapered residual core-area 50 therein. Which impart controls aggressiveness and synthesizing of zone-cutting edge 39a, 40a with chisel-point 36a, 36b as defined in advantages 5A enhancing the same benefits thereof.

9A. A ninth advantages is an Optimal Chisel-point System 36. By tapering residual core-area 50 near axis-point 35 provides chisel-point 36a and 36b with a reduced width or length, and minimizes contact-area of negative cutting-angles set thereon by rake-angle RA fixed on cutting-plane 37a, 37b affording the following benefits:

20b. Which results in excellent centering and penetration while retaining the integral-strength throughout the drill 30 length thereof.

21b. Residual core-area 50 further enhances unique incurvate lead-face wall 33 design in body 31 thereof. Whereby reducing a dependency for back-angle plane BA on cutting-plane 37a, 37b. In which only rake-angle RA containing incurvate-angle plane IA can provide adequate cutting exposure to zone-cutting edge 39a, 40a thereof. By only using this rake-angle RA provides a greater peripheral-contact-surface within a hole-perimeter of a work-piece material; being advantageous in regards to a marginal-thickness thereof.

5M. Refer now to FIG. 11 and 13A, which illustrates a Preferred Embodiment containing a fifth improvement of my Improved Rotary End Cutting Tool which is a Second-part Improved Flute Geometry. Impart being lag-face wall 34 of flute 32 which incorporates a support-step partition 45; and imposes its unique feature in body 31 therein. Support-step partition 45 originates and abruptly connects to incurvate lead-face wall 33 terminating near common bonding-point located on setup-line TRL at a predetermined distance from axis-point 35. Then projects away from this angle-point at a predetermined step-angle SA, ranging from 55 to 75 degrees, being radially set from setup-line TRL. At a variable length, ranging from 5 to 20 percent of a diameter thereof, that is dependent upon drill 30 application-design; as seen in comparing FIG. 13A to an alternate design seen in FIG. 13B. The open-end of support-step partition 45 then becomes a connecting point for as-for described and predetermined Compounded-curve to complete lag-face wall 34 which then terminates at a predetermined peripheral-edge point of body 31. Providing a predetermined chip-extracting volumetric-area therein. After all orchestration of symmetrical flute 32 is fixed at a predetermined common bonding-point provides the following advantages and benefits:

10A. A length advantage is Support-step partition 45 that provides additional thickness or area to its respective side of body 31 and cutting-edge 38a and 38b thereon. The depth of flute 32 as viewed impart of FIG. 11 A is the only variable; being completely arranged by common bonding-point that conforms longitudinally with a length of flute 32 therein (not shown). The resulting benefits are defined as follows:

22b. By modifying the lag-face wall 34 geometry, and adding a support-step partition 45 improves and reinforces integral-strength in an area of zone-cutting edge 39a, 40a, and chisel-point 36a, 36b.

23b. Which is some drilling operations using larger diameters, and/or extremely resistive work-piece materials, added strength in this area is advantageous to prevent breakage of chisel-point system 36, and extending usable life to drill 30.

11A. An eleventh advantage is a completed unique lag-face wall 34. Having a predetermined support-step partition 45 combined with a predetermined Compounded-curve continuing an appropriate volumetric chip-extracting area in body 31; providing the following benefits:

24b. Which allows the combined chisel-point 36a, 36b/ zone-cutting edge 39a, 40a to remain small, strong, and aggressive; while further adding integral-strength to cutting-edge 38a, 38b thereon.

25b. To providing a variable and abundant volumetric chip-extracting area in body 31, and in doing so, adding to integral-strength thereof.

6M. Refer now to FIG. 14, 14A, 15, 15A and 15B which illustrate in accordance with another embodiment of my Improved Rotary End Cutting Tool. Containing a sixth improvement which is a Unique Insert Cutting Unit Embodiment 47. In which all as-for described and illustrated improvements, advantages, and benefits are confined and contained impart thereof. Having a first Fixed-version, and a second Removable-version containing axis-point 35 that is now a center thereof. In which both Versions plurally near-replicates the conical-end, and replaces a portional-part of insert-body 31a, side-cutter 46a, 46b, lead-face wall 33, cutting-plane 37a,37b, residual core-area 50, and all grooves 41 and cutting-edge 38a, 38b thereon. Thereby completely isolating all essential features to afford shearing. When insert cutting-unit 47 is fixed and unified in insert-body 31a that contains all as-for previous improvements pertaining too thereof. With exception to a predetermined height difference related to cutting plane 37a, 37b thereof.

In which replicated-portion of cutting-plane 37a, 37b on insert cutting-unit 47 containing rake-angle RA is fractionally-advantaged by a predetermined distance above a remaining-portion of cutting plane 37a, 37b on insert-body 31a. Providing total-surface contact to insert cutting-unit 47 thereof. Which diminishes remaining-portion of cutting-plane 37a, 37b on insert-body 31a to a recessed conical-support-plane no longer being a contributing factor to a shearing-process. This intern, renders a remaining-portion of side-cutter 46a, 46b, lead-face wall 33, residual core-area 50, and insert-body 31a to being support-members for their cloned counter-parts as well. Further providing insert cutting-unit 47 the dominating factor to diameter and all cutting-features thereof. In which a dihedral thrust-face wall 55a, 55b is provided on a rear-portion of insert cutting-unit 47. That is designed to fit between an equally-conforming receiver thrust-face wall 56a, 56b in insert-body 31a as seen assembled in FIG. 14 and 15.

Cutting-plane 37a, 37b on insert cutting-unit 47 (see FIG. 14) is confined between cutting-edge 38a, 38b and trust-face wall 55a, 55b. A predetermined outer-perimeter length thereof is chosen from a variable peripheral-edge width PW ranging from 100 to 200 percent of base-width BW (see FIG. 15A). Which is influenced by a predetermined pitch-angle PA used on lead-face wall 33 of inserting cutting-unit 47 (see FIG. 15). A predetermined overall-length of insert cutting-unit 47, from axis-point 35 to bottom-face 57, is a variable length ranging up to 100 percent of a diameter thereof. In which lead-face wall 33 on insert cutting-unit 47 near-conforms to same features of its counter-part lead-face wall 33 in insert-body 31a; including pitch-angle PA to near-simulate the helix-angle HA therein. This resulting to provide a smooth transition between individual lead-face walls 33 therein. With all advantages and benefits thereof being included in further improvements that follow:

7M. Refer now to FIG. 14, 15 and 15A which illustrate a seventh improvement of an embodiment of my Improved Rotary End Cutting Tool which is a Unique Inter-lock Design. That is designed to provide a directional-lock and centering to insert cutting-unit 47 when assembled in insert-body 31a. In which dihedral thrust-face wall 55a, 55b is provided on a rear-portion of insert cutting-unit embodiment 47; being located on an opposite-side of cutting-edge 38a, 38b thereon. That is designed to fit between an equally conforming receiver thrust-face wall 56a, 56b located on either forward-side of a remaining stem-portion of insert-body 31a; as seen assembled in FIG. 14 and 15. Refer now to FIG. 15A for a clearer view; wherein an angled-face of dihedral thrust-face wall 55a/ 56a, and 55b/ 56b further contains a secondary face-plane wall SF that replaces a portional-part of lag-face wall 34 in insert-body 31a. In which face-plane wall SF is set at a variable angle ranging from 30 to 60 degrees off a center-line of insert cutting-unit 47 therein. And containing a width from axis-point 35 near-equal to a predetermined base-width BW of insert cutting-unit 47; and being duplicated in insert-body 31a to complete forming an insert-holding receiver thereof.

The distance between opposing primary receiver thrust-face wall 56a, 56b in insert-body 31a conforms with a variable base-width BW of insert cutting-unit 47 that can range up to 50 percent of a diameter thereof. A leading-edge of a bottom-face 57 on insert cutting-unit 47 near-conforms to contours of a leading-edge of receiver seat-face 58 in insert-holding receiver area of insert-body 31a that is influenced by lead-face wall 33 of flute 32 therein, as viewed in FIG. 15A. A determined inserted-length IL (see FIG. 15) is directly influenced by helix-angle HA used in insert-body 31a thereof. This inserted-length IL also determines a final contact-area of torsional-transfer between thrust-face wall 55a/56a, 55b/56b on insert cutting-unit 47, and insert-body 31a. With advantages and benefits thereof to follow:

12A. A twelfth advantages is a positive-centering interlock between insert cutting-unit 47 and insert-holding body 31a, providing the following benefits:

26b. This unique design tends to provide an automatic axial-centering and retention thereof when assembled. The stable centering, shearing-ease, reduced penetration-effort, precision produced, and demonstrated by Improved Insert Drill 30a; combined with the integral-strength of insert-drill body 31a. Affords primary thrust-face wall 55a/56a, 55b/ 56b thereon substantial fortitude to sustain encountered cutting-resistance when employed in a work-piece material.

27b. Further providing a positive directional-lock between insert cutting-unit 47 and insert-holding body 31a. If inadvertently, Improved Insert Drill 30a should be rotated in a reversed direction of designed rotation R.

28b. This unique and simple X-type design should add minimal expense to production costs thereof; for all advantages and benefits it affords my Improved Insert-type Drill 30a as depicted in ongoing disclosures.

8M. Refer now to FIG. 14A, which illustrate an eighth improvement of an embodiment of my Improved Rotary End Cutting Tool which is a Uniquely Short Cutting Edge 38a, 38b. An upper-portion of lead-face wall 33 near cutting-edge 38a, 38b has a proportional-sized tapered concave relief or swale 59 designed between a peripheral-edge of side-cutter 46a, 46b and a longitudinal face-wall of support-step partition 45 near chisel-point 36a, 36b providing the following advantages and benefits:

13A. A thirteenth advantages is a Xyresic Sharp Cutting-edge 38a, 38b on insert cutting-unit 47. In which tapered concave swale 59 is located to influence lead-face wall 33 with a curved pitch-angle PA, and a near-razor sharpness to cutting-edge 38a, 38b. Knowing that a helix-angle HA influences sharpness to cutting-edge 38a, 38b; but involves "limiting-restrictions" to insert-holding body 31a when exceeding 30 degrees thereof (pertaining to inserted-length IL as defined in improvement 7M). A tapered concave swale 59 substitutes for a stronger helix-angle HA, and provides a proportionally improved cutting-angle more harmonized to changing surface-speeds across cutting-edge 38a, 38b thereof providing the following benefits:

29b. This tapered concave swale 59 superbly enhances all benefits outlined in advantage 2A concerning better curling influence to shavings produced thereof. Which overall, demonstrates an improved cleaner cutting-effect to both material and shaving; and displaying little-to-no edge-dulling resulting from tapered concave swale 50 implanted thereon. Which indicates less heat-generation in the actual element-separation involved in a shearing-process thereof.

30b. In which tapered concave swale 59 is equally employed in a one-piece drill 30 as well, by using a further production-setup thereof, which was originally conceived thereon.

9M. Refer now to FIG. 14, 15, 15A, 15B and 16 which illustrate a ninth improvement of an embodiment of my Improved Rotary End Cutting Tool which is Insert-Holding Body 31a. Having a near-conforming insert-holding receiver designed therein. Containing all as-for described and illustrated improvements afforded to a one-piece drill 30, and body 31 thereof. With exception impart to Replicated and Replaced-portions being contained in Either-version of insert-cutting-unit 47. And impart to taper-distance TD of residual core-area 50, as seen in FIG. 11A, being limited in distance to receiver-face 58 of insert-holding body 31a. In which supports bottom-face 57 on insert cutting-unit 47 when assembled therein. With taper-distance TD portion thereof being completely contained in Either-version insert cutting-unit 47 used therein. Whereas insert-holding body 31a further displays a constant predetermined flute-depth FD from receiver-face 58 towards a predetermined end-point near the shank-end (not shown). This being a variable-depth ranging from 30 to 40 percent of a diameter thereof which is influenced by Either-version of insert cutting-unit 47 employed thereon.

Wherein insert-holding body 31a further including an Improved Flute Geometry. Conforming impart to lead-face wall 33 features used in insert cutting-unit 47 as seen in FIG. 14, 15, and impart to lag-face wall 34 as seen in FIG. 13C. With a whole-directive to provide a smooth transition of all features thereof between insert cutting-unit 47 and insert-holding body 31a when assembled thereof; providing the following advantages and benefits:

14A. A fourteenth advantages is a Constant Length Insert-holding Body 31a provided from a height-advantage displayed on insert cutting-unit 47. Which near-eliminates wear to forward-end of insert-holding body 31a; that overall, provides only attachment, length, rotary torque, and direction for insert cutting-unit 47 when attached therein.

31b. The integral-strength of insert-holding body 31a having a heavy residual core-area 50 provided from combined effects of all described improvements. Allows insert-holding body 31a to be constructed form a least-expensive and appropriate-method, and/or metal-alloy material, without diminishing performance thereof when assembled with insert cutting-unit 47 produced from a variety of metal-alloy materials suitable thereof.

10M. Refer now to FIG. 14, 15, 15A, and 18 which illustrate a tenth improvement of an embodiment of my Improved Rotary End Cutting Tool which is a Fixed-Version Insert Cutting Unit 47. From combined effects of: better controlling the CLR problem, near eliminating the SSD problem, reducing cutting resistance. Along with an improved and uniquely combined "chisel point/curved zone-cutting edge 36a/ 39a, 36b/40a design" that near-eliminates a Premature Slicing problem; provided form all as-for described improvements. In which allowing an embodiment-area thereof to be condensed to a uniquely small, simple, and compact insert cutting-unit 47. Due mainly to nearly resolving all disclosed prior-problems. Thereby affording a fixed-version insert cutting-unit 47 that is permanently attached after being assembled in insert-holding body 31a by a Thermal-Fusion process means. Using one of a variety of appropriate metal-alloys suitable for such attachment thereof. Providing the following advantages and benefits:

15A. A fifteenth advantage is a Diameter Versatility by using a Fixed-version insert cutting-unit 47. In which Fixed-version being provided mainly to be used in smaller diameter drills 30, or having a residual core-area 50 insufficient to afford a Removable-version insert cutting-unit 47, providing the following benefits:

32b. Providing an Improved fixed insert-drill 30a produced in smaller diameters. Displaying a stable, smooth, aggressive, starting and shearing cutting system; while reducing cutting-area resistance and rotational torque now presently required by a comparable-sized Prior Art drill 30.

33b. In which has demonstrated near seven-times longer working time and production over a compatible-sized Prior Art drill 30 on many occasions.

34b. In which has also demonstrated many times: a superior precisioned-hole displaying an interior wall-finish comparable to a reamer-finish method in all work-piece materials tested therein. With test material defined: as a variety of woods and plastics; aluminum, copper, brass, cast-iron, mild-steel, and stainless-steel. With tests conducted by sequentially using the same 25.4 mm (1 inch) diameter Improved drill 30 on each thereof; without modifying or re-sharpening between each material tested thereon. Further being performed first using a "Dry-method" on all materials; then using a "Wet-method" on appropriate materials thereof which resulted a near mirror-like wall-finish in most all metals tested.

16A. A sixteenth advantage is a simplified Production Method. With insert cutting-unit 47 being produced near/or completely finished using a Sintering or Forging process means; requiring minimal, if any, additional Machining thereof; providing the following benefits:

35b. In which insert cutting-unit 47 could be permanently fixed in a less expensively constructed insert-holding body 31a by using a Thermal-Fusion process means. Having the same benefits as would be experienced in a same-element one-piece drill 30; but at a fraction of cost thereof, providing the following advantage:

17A. A seventeenth advantage is a Less-expensive Superior Metal-alloy Drill 30a by only using a Fixed-version insert cutting-unit 47 composed thereof. In which to produce a less expensive Cobalt, Carbide, or other Special metal-alloy drill 30a having same benefits as previously disclosed.

Figure 5:
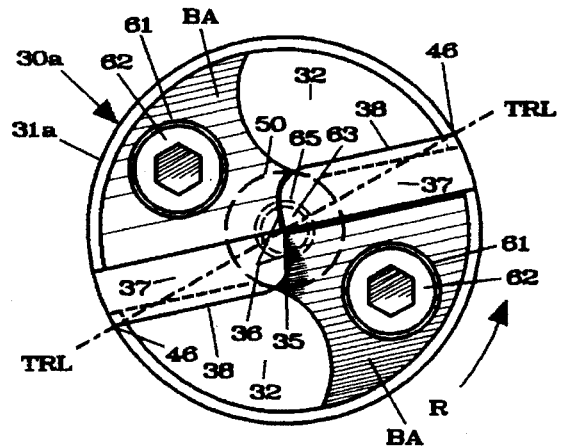
FIG. 5 is a forward-end view of a Prior Art twist-drill possessing a replaceable cutting unit forward-end, reference U.S. Pat. No. 4,950,108, A. Roos, dated Aug. 21, 1990.
Figure 6:
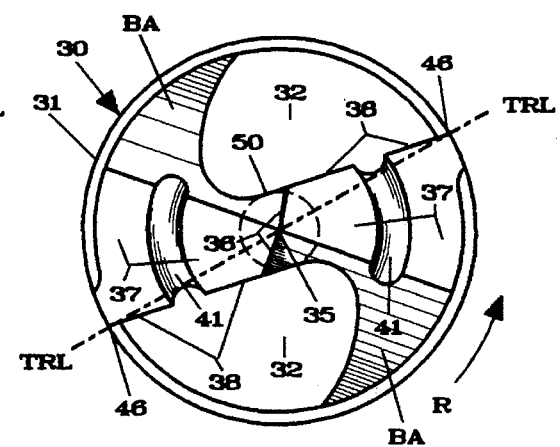
FIG. 6 is a forward-end view of a Prior Art twist-drill that possesses a defined groove in each cutting-plane, reference U.S. Pat. No. 5,011,342, G. Hsu, dated Apr. 30, 1991.

11M. Refer now to FIG. 14, 14A, 15A, 15B and 16 which illustrate an eleventh improvement of an embodiment of my Improved Rotary End Cutting Tool which is a Removable-version Insert Cutting Unit 47. In which Removable-version being further aligned and fixed within an axial-center of insert-holding body 31a. By using a center-locking dowel 48 extending from bottom-face 57 of insert cutting-unit 47 being an included element confined around a divisional-center thereof containing a predetermined precision dowel-diameter DD that is directly influenced by residual core-area 50. Center-locking dowel 48 requires a near-conforming dowel receptacle-hole 49 fixed below receiver-face 58 and within the axial-center of insert-holding body 31a containing a slight interference fit to a diameter thereof. In which dowel-length DL is a variable ranging up to 100 percent of insert-holding body 31a diameter. Having the following added advantages and benefits:

18A. An eighteenth advantage is a Simple Center-locking Dowel 48 extension of insert cutting-unit 47. The dihedral thrust-face wall 55a, 55b of insert cutting unit 47, when mated to conforming receiver thrust-face wall 56a, 56b of insert-drill body 31a, provides a positive directional key-lock between the units. If inadvertently, the improved insert-drill 30a should be rotated in the reverse direction of rotation R. This design tends to alleviate torsional strain to center-locking dowel 48. The stable centering, reduced rotational effort, shearing ease, precision produced and demonstrated combined with the integral-strength of insert-drill body 31a. Offers thrust-face wall 55a/56a, 55b/56b substantial fortitude to sustain encountered cutting resistance. Whereby providing center-locking dowel 48 to adequately secure insert cutting-unit 47 within insert-drill body 31a providing the following benefit:

36b. Having a uniquely simple center-locking dowel 48 extension as part of insert cutting-unit embodiment 47 should be easily produced using a sintering or forging method. Which might require minimal added-machining to perfect roundness thereof. But, in comparison to a Prior Art drill 30 as seen in FIG. 5 among others researched; what added costs involved would be well invested from all advantage and benefits provided thereof.

19A. An nineteenth advantage is a Constant Length Insert-drill 30a remaining a same length every time Removable-version insert cutting-unit 47 is changed. After insert-drill 30a is fixed in a rotary power-unit, and calibrated for an intended work-depth. The initial setup to insert-holding body 31a would not have to be disturbed to change insert cutting-unit 47; providing the following benefits:

37b. This feature would be very beneficial to extensive drilling operations, where depth is critical, or multi-drill-head power-units are utilized. While usually requires are-calibration or depth-synchronizing between multiple-drill heads upon each change thereof using a one-piece drill 30 due to continuously becoming shorter after every re-sharpening thereof. Thereby saving valuable setup time and associated production costs thereof by using my Improved Removable-version Insert-drill 30a.

20A. A twentieth advantage is a Variety of Available Diameters for Removable-version insert cutting-unit 47. In which insert-holding body 31a can be up to 25 percent undersized of a given diameter-range; which would allow using a insert cutting-unit 47 ranging from that same under-size-diameter up to a prescribed finished-diameter specified; providing the following benefits:

38b. This would be very beneficial for precision reaming, threading, and basic hole-drilling of different pieces of compounded or like components. Such as would be found in a typical ring-gear, precision-mounted to a flanged carrier-assembly, used in a present-day automobile differential. Which typically uses precision-ground doweled cap-screws, stud, or bolts to align and mount together as a unit requiring a precise radial-center; among countless other similar examples.

21A. A twenty-first advantages is a Disposable Insert Cutting-unit 47 of a variety of sizes and/or designs; being more versatile for drilling operations performed to work-piece materials involved. This Disposable-version could be accomplished very easily using a variety of metal-alloys combined with a mass-production method and setup providing the following benefits:

39b. In which insert cutting-unit 47 being produced near/or completely finished using a Sintering or Forging process means; requiring minimal, if any, additional Machining thereof. With the production costs thereof being less exorbitant than for a whole drill 30 composed of same metal-alloys. This advantage affords a very versatile and economical drilling system where only distinct insert cutting-units 47, and fractional-costs thereof, would be required in inventory for a specific-size range. At a fraction-of-cost each more comparable to the total overall-expenses involved in re-sharpening a Prior Art drill 30 thereof.

22A. A twenty-second advantage is Reduction of Drill 30 Reserve Inventory that would be required in repetitious hole-drilling operations. Especially for multi-drill-head units used in large manufacturing concerns where this type of machine is more common; providing the following benefits:

40b. This would save a substantial amount of presently incurred-costs associated with inventory stock. Due to reduction of "replicated-sizes" now required as "backup"; to provide continual production throughout a normal eight-hour shift. Resulting from a Prior Art drill 30 becoming dull, and requiring replacing or re-sharpening several-times in that time-frame period. In addition to saving countless hours of labor-sharpening-time now experienced with most current manufacturing practices.

41b. Aside from all-around superior performance my Improved drill 30 has; it also demonstrated an extended working time as much as 7 times longer than a Prior Art drill 30 as seen in FIG. 1. The inventory could consist mainly of a less-expensive Replaceable insert cutting-unit 47 of various sizes. In comparison to inventory costs to provide an adequate supply of a one-piece Prior Art drill 30 unit of various sizes.

23A. A twenty-third advantage if a Versatile Hardness Insert-drill 30a. Having a uniquely simple embodiment designs allows Removable-version insert cutting-unit 47 to be produced in a variety of suitable metal-alloys available; providing the following benefits:

42b. By only using a Removable-version insert cutting-unit 47 composed thereof; a less expensive Cobalt, Carbide, or other Special metal-alloy drill 30a can be produced. With the production cost thereof being less-exorbitant than for a whole one-piece drill 30 having its entirety produced from a same metal-alloy.

43b. This advantage affords a very versatile and economical drilling system after a complete Improved Removable-version Insert Drill 30a was once purchased and inventoried. Due from minimal wear to insert-holding body 31a allowing it to be repeatable used; only a distinct insert cutting-unit 47, and fractional-cost thereof, would be required in inventory for a specific size-range and hardness thereof.

44b. This would be very beneficial for precision reaming, threading, and basic hole-drilling of different work-pieces having compounded or like components composed of different metal-alloys that would require such hardness-change thereof in order to complete a product. Which can be quickly accomplished by simply changing to a "required-hardness" insert cutting-unit 47; rather than a complete one-piece drill 30; and loosing all setup and time involved thereof in doing so.

12M. Refer now to FIG. 14A, 15, 15A, 15B, and 16 which illustrate a twelfth improvement of an embodiment of my Improved Rotary End Cutting Tool which is a Simple Catching Device. After Removable-version insert cutting-unit 47 is assembled in insert-holding body 31a, to the designed depth, is then fixed in place by a locking set-screw means 53, as seen in FIG. 15, 15B. In which locking set-screw means 53, of an appropriate-size, is provided in insert-holding body 31*a* by a conforming threaded-hole means 54 near a divisional-center of center-locking dowel 48 length thereof. This threaded-hole means 54 further being near-centered in a peripheral margin-area of insert-holding body 31*a* as seen in FIG. 15B. And located between lag-face wall 34 and lead-face wall 33 isolated by flute 32 on either-side thereof. In which threaded-hole means 43 exposes center-locking dowel 48 to be contacted and fixed by locking set-screw means 53 when bottomed therein. The advantages and benefits will be defined as follows:

24A. A twenty-fourth advantages is a Simple Set-screw 53 Lock-device confined within insert-holding body 31*a* being located in a stronger-portion thereof, and completely isolated from damage; or interfering with a drilling-operation thereof. Which might require air-flushing on occasions, and can be easily changed after becoming worn from use; due to being a present-day commonly-produced set-screw means 53 available in a variety of shapes and sizes. Providing the following benefits:

45*b*. In which Removable-version insert cutting-unit 47 being easily and quickly attached after replacing from becoming dull, or changing fractional-sizes, or hardness thereof. Without disturbing the insert-holding body 31*a* mounting or setup in the rotary power-unit. By simply inserting a conforming hand-tool (not shown) in treaded-hole means 54 to contact set-screw means 53, and turning in desired direction to tighten or loosen as needed thereof.

13M. Refer now to FIG. 15, 15B and 16 which illustrate a thirteenth improvement of an embodiment of my Improved Rotary End Cutting Tool which is a Simple Clean-out/Extraction Device. Located directly opposite, and below set-screw means 53, is a clean-out/extraction hole 51 provided in an opposite peripheral margin-area of insert-holding body 31*a*. In which using the same location parameters as defined for set-screw 53 thereof. Except, an axial center-line of clean-out/extraction hole 51, of near same diameter of set-screw means 53, is designed to align to a bottom-end of dowel-length DL of center-locking dowel 48 thereof. And is sealed at stated peripheral margin-area-surface by a recessed and appropriate-sized threaded plug-screw means 52. In which clean-out/extraction hole 51 provides access for an appropriate tapered-drift (not shown) to be inserted to dislodge the center-locking dowel 48 and insert cutting-unit 47 from their fixed positions in insert-holding body 31*a*. This affords easy removal, and air flushing of foreign matter from dowel receptacle-hole 49 when necessary. The advantages and benefits will be defined as follows:

25A. A twenty-fifth advantage is a Quick Extraction Method providing a simple way of dislodging precise contact-surfaces between insert cutting-unit 47 and insert-holding body 31*a* thereof. Without disturbing a mounting setup of insert-drill 30*a* in a rotary power-unit; providing the following benefits:

46*b*. By just removing the threaded plug-screw means 52, and inserting a taper-drift, then tapping it with a hammer, provides ample spacing between companion-plane of bottom-face 57 on insert cutting-unit 47 and receiver-face 58 in insert-drill body 31*a*. Then a tapered pry-tool can be inserted in this space (if needed), to completely expel insert cutting-unit 47 from insert-holding body 31*a*. After which, all surfaces including dowel-receptacle hole 49 can be air-flushed or foreign-matter to receive a new insert cutting-unit 47.

Operation - FIG. 7, 8, 9, 10, 11, 14, 15

The manner of using my Improved Rotary End Cutting Tool is identical to that for twist-drills and end-mills now presently used. Namely, to be mounted in a rotary power-tool and employed in a work-piece to produce a hole or slot. However, diameters thereof tend to influence a different flute geometry, cutting-edge arrangement, and orchestration of typical-purposed offset grooving 41 thereon. In which dills 30 under 6.35 mm (¼ inch) diameter require little-to-no grooves 41 due to a Side Slip Factor being within a tolerable-margin. Requiring only flute geometry, taper-angle TA, cutting-edge 38 arrangement, as depicted in FIG. 7 thru 11 with a face-angle FA more conforming to that in FIG. 7. Whereas, incorporating typical-purposed grooves 41 in larger diameter drills 30 display their advantages, and importance thereof differently; being more pronounced as diameters increase thereon. In which a drill-end configuration as illustrated in FIG. 11, 14 being the essence for diameters larger than 12.7 mm (½ inch); with minor feature variations being employed in diameters below and above thereof.

For example: "Using a 31.75 mm (1 ¼ inch) diameter HSS drill 30 similar to FIG. 14 containing tapered concave swale 59; being setup at 195 RPM which is over 2 times faster than recommended speed. Was employed to a series of (6) 25.4 mm (1 inch) thick mild-steel picking-eye plates. Which concluded a Reamer-like finished-hole in 46 seconds give-or-take one second; from initial chisel-point 36 contact to fully clearing through bottom-side of the plate. Producing a bundled-ball of shavings that could all be held in one hand; with very little, if any, chip-fragments being deployed. No centering-index was used other than a scribe-mark on the surface. This operation was performed on the (5) remaining plates within an equal time-frame producing equal results on each thereof. Which overall, required more time in setting up each plate to drill; therein what was used in concluding a hole therein."

In anther example: "A 12.7 mm (½ inch) diameter HSS drill 30 similar to FIG. 7 was employed throughout a new Rock Crushing Plant assembly being setup of the job-set. Which through the course-of-completion thereof; this ONE drill 30 compiled over 300 holes, and over an accumulated 177.8 cm (70 inches) of mild-steel thickness. In which being sequentially used between a drill-press and a electric-powered hand-held unit. Wherein the latter method being employed in all positions possible; with drill 30 displaying aggressiveness as would be expected using a pilot-hole. Here again, no purposed center-indexing or pilot-hole was used other than a chalk-mark to provide location for the purposed hole. Which has been extremely difficult to perform in the past using a Prior Art drill 30 similar to FIG. 1 thru 4 mounted in an electric-powered hand-held unit. With drill 30 showing minimal signs of dulling a time of job completion; being capable to perform further employment."

Summary, Ramifications, and Scope

Accordingly, the reader will see that by improving flute design, location and shape of cutting edge, adding typical-purposed offset grooving and a tapered flute depth in the forward-end of a drill; has completely created a new concept in drill design. Which has virtually revolutionized drill and end-mill construction methods as presently-known today. Apparently the Compound Leverage Resistance, Side Slip Differential, and Premature Slicing problems, as outlined in Prior Art, has never been fully investigated until my present Improved Rotary End Cutting Tool.

Which all started out from necessity; to improve axial-centering, easier penetration, and longer production-time between drill re-sharpening; being conducted on a precision-drilling setup. The typical-purposed offset grooving along with a split-chisel point was employed to a Prior Art 28.575 mm (1 ⅛ inch) diameter drill, similar to FIG. 1, with astounding results. In summarizing: providing instant centering and penetration; stopped orbiting and drill-chatter; reduced completion-time from 85 to 25 minutes per each unit; and allowed finish-drilling 68 of 96 holes without re-sharpening. Demonstrating: an increased 340 percent faster or 70.6 percent less production-time; retaining sharpness near 7 times longer than previous Prior Art design. Being that: starting with a new drill producing 8 holes, and two re-sharpenings produced 10 holes each; with the balance of 68 holes being completed after discovery thereof. Which stimulated further research, investigative development, and resulting Objects, Improvements, Advantages, and Benefits herein.

The above descriptions and drawings are only illustrative of preferred embodiments which achieve the objects, features, and advantages of my Improved Rotary End Cutting Tool. It will be obvious to those skilled in the art that various changes and modifications may be made without departing from the scope therein. And it is intended to cover in the appended claims all such modifications and equivalents as fall within the true spirit and scope of my Improved Rotary End Cutting Tool.

I claim:

1. A method to produce an improved rotary end cutting tool with a basic description being a cylindrically-long body, divisional-portioned, and disposing two distinct ends comprising: a first end-portion containing a shank-end means, for accommodating attachment to a rotary power tool means, for rotational power around a longitudinal axial-center line therein and through a barrel-portion being the major-portion comprising:

a plurally-striated body resulting form a predetermined, plural, symmetrically-arranged, longitudinal, machining-method means performed to the barrel-portion to provide the improvements comprising:

a plural-number of a purposed-flute means comprising: a predetermined chip-extracting volumetric-area provided from a first-purposed lead-face wall means containing a predetermined incurvate face-plane feature, facing a prescribed direction of rotation, and a second-purposed lag-face wall means containing a predetermined-composite of dissimilar correlated arc-lines, facing the first lead-face wall means, imposing their respective features in the body, and is arranged by a compounded-setup procedural means comprising: a first common bonding-point means, defined as a precise connecting-point location using a predetermined measurement from the center line, located on a second setup-plane means labeled true radius line, defined as an imaginary setup plane between a peripheral-point on an outside-edge of said body and said center line therein, that begins longitudinally at a predetermined-point near the shank-end means, and runs parallel with said center line in a helical pattern means using a predetermined helix-angle towards a forward conical second end; being set between said first lead-face wall means and the second lag-face wall means; which also regulates a predetermined flute-depth to the purposed-flute means further including a predetermined taper-angle means containing a predetermined angle-point near the forward conical second-end, which in turn, provides a unique taper-end residual core-area means, derived from the purposed-flute means, in said body further including:

an equivalent number of fashioned cutting planes, which is a forward extreme end-point of said body, confined between the plural said flutes that further disposes a margin-area between the peripheral-edge of said body and a inner-edge-line of each cutting plane thereon that terminate and adjoin at a forward extreme-end of said axial-center line being an axis-point in said conical second-end containing a predetermined radial-angle being set from a right-angle of said center line, and radially employed to said end of said body further including:

a typical-volumetric radial-arc groove means comprising: a predetermined number, width, depth, and a calculated spacing means being systematically arranged on each said cutting plane by using a predetermined radial step-distance means from said axis-point; and is methodically fixed in each said cutting plane by a method means; accordingly, providing each said cutting plane containing the grooves therein to be unique from the other said cutting plane containing said grooves therein; and organizing an individual-tracking means to avoid merging a fractional path-area of said grooves therein each said cutting plane with any path-area from any said grooves therein any other said cutting plane thereof; when rotated in the designed direction around the axis-point of said conical second-end of said body further including:

a chisel-point system means comprising: an aggressive cutting-edge to a forward-portion of the inner-edge-line of each said cutting plane that commonly adjoin through said axis-point, and being provided by a sequential predetermined back-angle plane means defined as a descending-planate machining-method means started on a rear portion-area of a preceding said cutting plane near said axis-point, and being positioned to infringe the forward-portion of said inner-edge-line on a following said cutting plane, and machined off to the end of the preceding said cutting plane using a predetermined-angle towards said shank-end and in a predetermined-angle direction towards a near central-point of a flute-void in an adjoining said flute set between said cutting planes in said body further including:

a predetermined peripheral surface-area of the plural-striated said body located between said flutes therein involving a surface-area from a tangent-edge of said lag-face wall means in a preceding said flute to a predetermined margin-line set parallel and from a tangent-edge of said lead-face wall means of a forward adjacent said flute, being provided by a conforming longitudinal machining-method means using a predetermined-depth thereof, resulting the remaining peripheral contact surface-area displaying a full diameter of said body.

2. The improved rotary end cutting tool according to claim 1, in which said cutting plane is further including: a negative rake-angle means comprising: a predetermined negative feed-angle means that declines away from the work-piece surface in the opposite direction of rotation and a incurvate-plane angle means containing a greater negative-angle near said axis-point than the feed-angle at said peripheral-edge of said cutting plane; being provided by an appropriate-method means thereby affording said cutting plane with a varying feed-angle better conformed to a varying surface-speed change between said axis-point and said peripheral-edge; which also affords said chisel-point system means a more positive and aggressive cutting-edge angle advantage for contacting said surface; said incurvate-plane angle means can substitute for, and be used with, said back-angle plane means depending on a design application thereof.

3. The improved rotary end cutting tool according to claim 2, in which said body is further including: a unique incurvate cutting-edge caused from a junction of said cutting plane with said lead-face wall means containing the incurvate face-plane feature defined as a predetermined near flat-face plane merged with a variable-curve means containing a variable-adjusting radius, dispensed between said peripheral-edge and said common bonding-point means located on said second setup-plane means labeled true radius line, portraying a divisional-ratio distance therein predominantly favoring the near flat-face plane, and is influenced by a variable face-angle means containing a variable-angle ranging from alignment with said second setup-plane to a predetermined negative-angle direction behind said axis-point, in regards to said rotation being positive when viewed from said conical second-end, resulting in said merged variable-curve means to adjust accordingly in a remaining allotted-distance thereof producing a broad variable-concept to said unique incurvate cutting-edge; thereby, providing a more definite radial direction to shearing when contains a work piece material in said prescribed direction; whereby near eliminating a premature slicing problem, and provides a better control to a compound leverage resistance problem in said body further including:

a determined number of zone-cutting edges resulting from said groove means in said cutting plane in which each zone-cutting edge establishes an individual radial-path parameter from and around said axis-point with a cutting sharpness being influenced by either of two means of which the first is the predetermined helix angle, and the second means comparing:

a tapered concave swale means containing a predetermined size and appropriate shape being employed in each said lead-face wall means of said body, and provided by a machining and/or mechanical method means, in a lower immediate-area of said unique cutting-edge being located so as to influence a near xyresic-sharpness to said unique incurvate cutting-edge; thereby, providing each said zone-cutting edge thereon with a superb cutting proficiency, and better control to produce a shaving that stays continual; with each shaving forming a unique helical-coil pattern that surrounds a preceding helical-coil shaving starting a serried series process: of a small-diameter open-helical near said axis-point, then progressively increasing the diameter and compacting the helical-coil as the process moves out towards a peripheral-end of said zone-cutting edges; reducing a compact unitized bundle of shavings collected into a single, rough, continual-shaving; which provides an easy control and ejecting by said flutes.

4. The improved rotary end cutting tool according to claim 3, wherein the unique residual core-area means comprising: a predetermined flute point-end depth, the predetermined main flute-depth, the predetermined angle-point length from said axis-point, and a taper-angle means containing an adjusting-angle influenced between the two points near said conical second-end to provide a residual core radius at said axis-point greater than one percent of said body diameter, and a constant said flute-depth between said angle-point and said predetermined-point near said shank-end means; all being controlled by said compounded-setup procedural means; thereby, providing said body with an appropriately-small-area said chisel-point system that synthesizes with said unique cutting-edge while preserving a constant and optimum strength throughout said body; whereby demonstrating a uniquely stable, self-starting, and aggressive said chisel-point system synthesizing with said unique cutting-edge; which over-all, produces a superior rotary end cutting system in comparison to a cutting system provided from a straight said residual core-area in said body.

5. The improved rotary end cutting tool according to claim 4, wherein said lag-face all means of said flute has two versions using the composite of dissimilar correlated arc-lines that is derived from each said arc-line having a unique radial-center from the other said arc-lines thereof, and defined as a predetermined compounded arc-line means that orchestrates the predetermined chip-extracting volumetric-area in said body, conforming to said longitudinal length of said flute in which said lag-face wall means comprising:

a first version that originates at said common bonding-point means on said second setup-plane means labeled true radius line and synthesizes with said merged variable-curve means of said lead-face wall means thereon, and continues to end at said peripheral-edge point of said body, providing an appropriate predetermined said volumetric-area between said lead-face wall means and said lag-face wall means required to accept and eject a series of shavings produced from said unique cutting-edge when said conical-end is immersed in a work piece material and rotated in said direction, and in a second improved version the predetermined compounded arc-line means originates at a end of a projected support-set partition means that starts and abruptly connects to said merged variable-curve means at said common bonding-point means, and extends out from said axis-point at a predetermined angle set-off said second setup-plane means to a predetermined length means being directly influenced by said diameter, a work application factor, and said volumetric-area requirement providing an added-area in said cutting plane of said body in back of said unique cutting-edge and said chisel-point system; affording a maximum reinforcement thereof for extreme working employment without diminishing said volumetric-area from the scope of said flutes purpose in said body.

6. A method to produce an improved rotary end cutting tool with a basic description being a cylindrically-long body, divisional-portioned, containing a unique fixed-version insert cutting-unit means, disposing two distinct ends comprising: a first end-portion containing a shank-end means, for accommodating attachment to a rotary power tool means, for rotational power around a longitudinal axial-center line therein and through a barrel-portion being the major-portion comparing:

a plurally-striated body resulting from a predetermined, plural, symmetrically-arranged, longitudinal, machining-method means performed to the barrel-portion to provide the improvements comprising:

a plural-number of a purposed-flute means comprising: a predetermined chip-extracting volumetric-area provided from a first-purposed lead-face wall means containing a predetermined incurvate face-plane feature, facing a prescribed direction of rotation, and a second-purposed lag-face wall means containing a predetermined-composite of dissimilar correlated arc-lines, facing the first lead-face wall means, imposing their respective features in the body, and is arranged by a compounded-setup procedural means comprising: a first common bonding-point means, defined as a precise connecting-point location using a predetermined measurement from the center line, located on a second setup-plane means labeled true radius line, defined as an imaginary setup plane between a peripheral-point on an outside-edge of said body and said center line therein, that begins longitudinally at a predetermined-point near the shank-end means, and runs parallel with said center line in a helical pattern means using a predetermined helix-angle towards a forward conical second end; being set between said first lead-face wall means and the second lag-face wall means; which also regulates a predetermined flute-depth to the purposed-flute means further including a predetermined taper-angle means containing a predetermined angle-point near the forward conical second-end, which in turn, provides a unique taper-end residual core-area means, derived from the purposed-flute means, in said body further including:

an equivalent number of fashioned cutting planes, which is a forward extreme end-point of said body, confined between the plural said flutes that further disposes a margin-area between the peripheral-edge of said body and a inner-edge-line of each cutting plane thereon that terminate and adjoin at a forward extreme-end of said axial-center line being an axis-point in said conical second-end containing a predetermined radial-angle being set from a right-angle of said center line, and radially employed to said end of said body further including:

a typical-volumetric radial-arc groove means comprising: a predetermined number, width, depth, and a calculated spacing means being symmetrically arranged on each said cutting plane by using a predetermined radial step-distance means from said axis-point and is methodically fixed in each said cutting plane by an appropriate-method means, accordingly, providing each said cutting plane containing the grooves therein to be unique from the other said cutting plane containing said grooves therein; and organizing an individual-tracking means to avoid merging a fractional path-area of said groove therein each said cutting plane with any path-area from any said grooves therein any other said cutting plane thereof; when rotated in the designed direction around the axis-point of said conical second-end of said body further including:

a chisel-point system means comprising: an aggressive cutting-edge to a forward-portion of the inner-edge-line of each said cutting plane than commonly adjoin through said axis-point, and being provided by a sequential predetermined back-angle plane means defined as a descending-planate machining-method means started on a rear portion-area of a preceding said cutting plane near said axis-point, and being positioned to infringe the forward-portion of said inner-edge-line on a following said cutting plane, and machined off to the end of the preceding said cutting plane using a predetermined-angle towards said shank-end and in a predetermined-angle direction towards a near central-point of a flute-void in an adjoining said flute set between said cutting planes in said body further including:

a predetermined peripheral surface-area of the plural-striated said body located between said flutes therein involving a surface-area from a tangent-edge of said lag-face wall means in a preceding said flute to a predetermined margin-line set parallel and from a tangent-edge of side lead-face wall means of a forward adjacent said flute, being provided by a conforming longitudinal machine-method means using a predetermined-depth thereof, resulting the remaining peripheral contact surface-area displaying a full diameter of said body further including:

a unique fixed insert cutting-unit embodiment means comprising: a conformity with said plural term, and a predetermined near-duplicating of said conical second-end containing the axis-point now being a center of the fixed insert cutting-unit that replicates and replaces a predetermined portional-means of said lead-face wall means, said lag-face wall means, said cutting plane, said residual core-area means, said peripheral-edge of said body, all of said incurvate cutting-edge and said multiple groove means therein, and further including:

a predetermined dihedral-angled thrust-face wall means on a predetermined rear-portion of the embodiment of said fixed insert cutting-unit located on an opposite-side of each said lead-face wall means thereon, when viewed from said conical second-end, that forms a directional-lock when assembled with a conforming insert-holding receiver means being provided in said body, by an appropriate-method means, to near envelop said fixed insert cutting-unit after being assembled in the inset-holding receiver in said body, and being permanently attached by a thermal-fusion method means using one of a verity of metal-alloy means suitable for such attachment thereof; with said cutting plane on said fixed insert cutting-unit having a predetermined height-advantage above a remaining-portion of said cutting plane on said body further including:

a required conversion to a insert-holding body being that said fixed insert cutting-unit has a superior influence to all cutting-features due to the height-advantage over said replicated and replaced-portions of said body thereby converting to a unique, integrally strong, and constant length insert-holding body providing only attachment, length, rotary direction and torque when assembled and permanently attached with said unique fixed insert cutting-unit; and employed as a rotary end cutting tool 7. The improved rotary end cutting tool according to claim 6, in which said unique insert cutting-unit further including: a peripheral-margin of said cutting plane having a variable peripheral-edge width means of up to 200 percent wider the a predetermined width of said embodiment of said fixed insert cutting-unit further including:

a negative rake-angle means comprising: a predetermined negative feed-angle means that declines away from the work-piece surface in the opposite direction of rotation and a incurvate-lane angle means containing a greater negative-angle near said axis-point than the feed-angle at said peripheral edge of said cutting plane; being provided by an appropriate-method means thereby affording said cutting plane with a varying feed-angle better conformed to a varying surface-speed change between said axis-point and said peripheral-edge;

which also affords said chisel-point system means a more positive and aggressive cutting-edge angle-advantage for contact said surface; said incurvate-plane angle means can substitute for, and be used with, said back-angle plane means depending on a design application thereof.

8. The improved rotary end cutting tool according to claim 7, in which said unique fixed insert cutting-unit, when assembled in said body, further including: a unique incurvate cutting-edge caused from a junction of said cutting plane with said lead-face wall means containing the incurvate face-plane feature defined as a predetermined near flat-face plane merged with a variable-curve means containing a variable-adjusting radius, disposed between said peripheral-edge and said common bonding-point means located on said second setup-plane means labeled true radius line, portraying a divisional-ratio distance therein predominantly favoring the near flat-face plane, and is influenced by a variable face-angle means containing a variable-angle ranging from alignment with said second setup-plane to a predetermined negative-angle direction behind said axis-point, in regards to said rotation being positive when viewed from said conical second-end, resulting in said merged variable-curve means to adjust accordingly in a remaining allotted-distance thereof producing a broad variable-concept to said unique incurvate cutting-edge; thereby, providing a more definite radial direction to shearing when contacting a work piece material in said prescribed direction; whereby near eliminating a premature slicing problem, and provides a better control to a compound leverage resistance problem in said fixed insert cutting-unit further including:

a determined number of zone-cutting edges resulting from said groove means in said cutting plane in which each zone-cutting edge establishes an individual radial-path parameter from and around said axis-point with a cutting sharpness being influenced by ether of two means of which the first is a pitch-angle means applied to said lead-face wall means of said insert cutting-unit embodiment to simulate the predetermined helix angle used in said flutes of the insert-holding body, and the second means comprising:

a tapered concave swale means containing a predetermined size and appropriate shape being employed in each said lead-face wall means of said fixed insert cutting-unit, and provided by a machining and/or mechanical method means in a lower immediate-area of said unique cutting-edge being located so as to influence a near xyresic-sharpness to said unique incurvate cutting-edge; thereby, providing each said zone-cutting edge thereon with a superb cutting proficiency, and better control to produce a shaving that stays continual; with each shaving forming a unique helical-coil pattern that surrounds a preceding helical coil shaving starting a serried series process: of a small-diameter open-helical near said axis-point, then progressively increasing the diameter and compacting the helical-coil as the process moves out towards a peripheral-end of said zone-cutting edges; producing a compact unitized bundle of shavings collected into a single round continual-shaving; which provides a easy control and ejecting by said flutes.

9. The improved rotary end cutting tool according to claim 8, in which said unique fixed insert cutting-unit embodiment further including: an upper-portional means of the unique residual core-area of said inert-holding body comprising: a residual core-area radius at said axis-point greater than one percent of said body diameter, an angle-point length means being a predetermined length of said embodiment from said axis-point, and a taper-angle means containing an adjusting-angle influenced between the radius at said axis-point and the predetermined bottom-width of said embodiment of said fixed insert cutting-unit; at which said bottom-width angle-point a predetermined said flute-depth becomes constant and continues to said predetermined-point near said shank-end means of said insert-holding body; being controlled by said compounded-setup procedural means, proportioned impart, to said fixed insert cutting-unit, and said insert-holding body; thereby, providing said fixed insert cutting-unit with an appropriately small-area said chisel-point system that synthesizes with said unique cutting-edge while preserving a constant and optimum strength throughout said insert-holding body; whereby, demonstrating a uniquely stable, self-starting, and aggressive said chisel-point system synthesizing with said unique incurvate cutting-edge; which overall, produces a superior rotary end cutting system in comparison to a cutting system provided from a straight said residual core-area in said body.

10. The improved rotary end cutting tool according to claim 9, herein said lag-face wall means of said flutes, being proportioned impart on said unique fixed insert cutting-unit and impart on said insert-holding body, has two versions to provide the predetermined chip-extracting volumetric-area in said insert-holding body by using the compounded arc-line means defined as the composite of dissimilar correlated arc-lines, derived from each said arc-line having a unique radial-center from the other said arc-lines thereof, that orchestrates said predetermined volumetric-area conforming to said longitudinal length of said flute in which said lag-face wall comprising:

a firs version that originates at said common bonding-point means on said second setup-plane means labeled true radius line and synthesizes with said merged variable-curve means of said lead-face wall means on said fixed insert cutting-unit, and then continues to end at said peripheral-edge point of said insert-holding body; providing an appropriate predetermined said volumetric-area between said lead-face wall means on said fixed insert cutting-unit and said lag-face wall means on said insert-holding body required to accept and eject a series of shavings produced from said unique cutting-edges; when said conical-end is immersed in a work piece material and rotated in said direction; whereas, said lag-face wall in a second improved version the predetermined compounded arc-line means originates at a end of a projected support-step partition means that starts and abruptly connects to said merged variable-curve means at said common bonding-point means, and extends out from said axis-point at a predetermined angle set-off said second setup-plane means to a predetermined length means that is directly influenced by said diameter, said volumetric-area requirement, and a base-width factor of said fixed insert cutting-unit wherein the support-step partition provides an added-area to said embodiment in back of said unique cutting-edge on said cutting plane, and said chisel-point system, affording a maximum reinforcement thereof for extreme working employment without diminishing said volumetric-area from the scope of said flutes purpose in said insert-holding body.

11. A method to produce an improved rotary end cutting tool with a basic description being a cylindrically-long body, divisional portioned, disposing two distinct ends, and a unique removable-version insert cutting-unit means, comprising: a first end-portion containing a shank-end means, for accommodating attachment to a rotary power tool means, for rotational power around a longitudinal axial-center line therein and through a barrel-portion being the major-portion comprising:

a plurally-striated body resulting from a predetermined, plural, symmetrically-arranged, longitudinal, machining-method means performed to the barrel-portion to provide the improvements comprising:

a plural-number of a purposed-flute means comprising: a predetermined chip-extracting volumetric-area provided from a first-purposed lead-face wall means containing a predetermined incurvate face-plane feature, facing a prescribed direction of rotation, and a second-purposed lag-face wall means containing a predetermined-composite of dissimilar correlated arc-lines, facing the first lead-face wall means, imposing their respective features in the body, and is arranged by a compounded-setup procedural means comprising: a first common bonding-point means, defined as a precise connecting-point location using a predetermined measurement from the center line, located on a second setup-plane means labeled true radius line, defined as an imaginary setup plane between a peripheral-point on an outside-edge of said body and said center line therein, that begins longitudinally at a predetermined-point near the shank-end means, and runs parallel with said center line in a helical pattern means using a predetermined helix-angle towards a forward conical second end; being set between said first lead-face wall means and the second lag-face wall means; which also regulates a predetermined flute-depth to the purposed-flute means further including a predetermined taper-angle means containing a predetermined angle-point near the forward conical second-end, which in turn, provides a unique taper-end residual core-area means, derived from the purposed-flute means, in said body further including:

an equivalent number of fashioned cutting planes, which is a forward extreme end-point of said body, confined between the plural said flutes that further disposes a margin-area between the peripheral-edge of said body and a inner-edge-line of each cutting plane thereon that terminate and adjoin at a forward extreme-end of said axial-center line being an axis-point in said conical second-end containing a predetermined radial-angle being set from a right-angle of said center line, and radially employed to said end of said body further including:

a typical-volumetric radial-arc groove means comprising: a predetermined number, width, depth, and a calculated spacing means being symmetrically arranged on each said cutting plane by using a predetermined radial step-distance means from said axis-point and is methodically fixed in each said cutting plane by a method means; accordingly, providing each said cutting plane containing the grooves therein to be unique from the other said cutting plane containing said grooves therein; and organizing an individual-tracking means to avoid merging a fraction path-area of said grooves therein each said cutting plane with any path-area from any said grooves therein any other said cutting plane thereof; when rotated in the designed direction around and axis-point of said conical second-end of said body further including:

a chisel-point system means comprising: an aggressive cutting-edge to a forward-portion of the inner-edge-line of each said cutting plane than commonly adjoin through said axis-point, and being provided by a sequential predetermined back-angle plane means defined as a descending-planate machining-method means started on a rear portion-area of a preceding said cutting plane near said axis-point, and being positioned to infringe the forward-portion of said inner-edge-line on a following said cutting plane, and machined off to the end of the preceding said cutting plane using a predetermined-angle towards said shank-end and in a predetermined-angle direction towards a near central-point of a flute-void in an adjoining said flute set between said cutting planes in said body further including:

a predetermined peripheral surface-area of the plural-striated said body located between said flutes therein involving a surface-area from a tangent-edge of said lag-face wall means in a preceding said flute to a predetermined margin-line set parallel and from a tangent-edge of side lead-face wall means of a forward adjacent said flute, being provided by a conforming longitudinal machine-method means using a predetermined-depth thereof, resulting the remaining peripheral contact surface-area displaying a full diameter of said body further including:

a unique removable-version insert cutting-unit embodiment means comprising: a conformity with said plural term, and a predetermined near-duplication of said conical second-end containing the axis-point now being a center of the removable insert cutting-unit that replicates and replaces a predetermined portional-means of said lead-face wall means, said lag-face wall means, said cutting plane, said residual core-area means, and said peripheral-edge of said body, all of said incurvate cutting-edge and said multiple groove means thereon, and further including:

a predetermined dihedral-angled thrust-face wall means on a predetermined rear-portion of the embodiment of said removable insert cutting-unit located on an opposite-side of each said lead-face wall means thereon, when viewed from said conical second-end, that forms a directional-lock when assembled with a conforming insert-holding receiver means being provided in said body, by an appropriate-method means, to near envelope said removable insert cutting-unit when assembled therein; with said cutting plane on said removable insert cutting-unit having a predetermined height-advantage above a remaining-portion of said cutting plane on said body; with said removable insert cutting-unit embodiment further including:

a center-locking dowel means being a unit extension from a bottom of said embodiment containing a predetermined diameter and length thereof in which, after said removable insert cutting-unit being assembled in the insert-holding receiver in said body, has a precise dimensional-contact with a predetermined near-conforming dowel receptacle-hole means being a removed-portion of said residual core-area means thereof, provided by an appropriate-method means, in said body further including:

a predetermined threaded locking-device means containing a conforming threaded-channel means fixed at a predetermined location in a peripheral margin-area of said body and extends through a wall of the dowel receptacle-hole therein to provide a near mid-point location on the length of aid center-locking dowel, after being inserted therein at a near right-angle of said center line thereof; so when the locking-device means is bottomed against the location on said center-locking dowel exposed therein; said removable insert cutting-unit is solidly fixed after being assembled in said insert-holding receiver in said body further including:

a predetermined clean-out/extraction device means containing an appropriately-sized access-channel means fixed at a predetermined location in a different peripheral margin-area of said body and extends through the wall of said dowel receptacle-hole therein, and being located to center on a bottom-end of said center-locking dowel at near a right-angle of said center line thereof, and being sealed by a predetermined recessed threaded-plug means containing a conforming threaded-port in the access-channel at near a surface of the peripheral margin-area location on said body further including:

a required conversion to a insert-holding body being that said removable insert cutting-unit has a superior influence to all cutting features due to the height-advantage over said replicated and replaced-portions of said body thereby converting to a unique, integrally strong, and constant length insert-holding body providing only attachment, length, rotary direction and torque when assembled, and thereby attached with said unique removable insert cutting-unit; and employed as a rotary end cutting tool.

12. The improved rotary end cutting tool according to claim 11, in which said unique removable insert cutting-unit further including: a peripheral-margin of said cutting plane having variable peripheral-edge width means of up to 200 percent wider than said predetermined width of said embodiment of said unique removable insert cutting-unit further including:

a negative rake-angle means comprising: a predetermined negative feed-angle means that declines away from the work-piece surface in the opposite direction of rotation and a incurvate-plane angle means containing a greater negative-angle near said axis-point than the feed-angle at said peripheral-edge of said cutting plane; being provided by an appropriate-method means thereby affording said cutting plane with a varying feed-angle better conformed to a varying surface-speed change between said axis-point and said peripheral-edge; which also affords said chisel-point system means a more positive and aggressive cutting-edge angle-advantage for contacting said surface; said incurvate-plane angle means can substitute for, and be used with, said back-angle plane means depending on a design application thereof.

13. The improved rotary end cutting tool according to claim 12, in which said unique removable insert cutting-unit when assembled in said body further including: a unique incurvate cutting-edge caused from a junction of said cutting plane with said lead-faced wall means containing the incurvate face-plane feature defined as a predetermined near flat-face plane merged with a variable-curve means containing a variable adjusting radius, dispensed between said peripheral-edge and said common bonding-point means located on said second setup-plane means labeled true radius line, portraying a divisional-ratio distance therein predominantly favoring the near flat-face plane, and is influenced by a variable face-angle means containing a variable-angle ranging from alignment with said second setup-plane to a predetermined negative-angle direction behind said axis-point, in regards to said rotation being positive when viewed from said conical second-end, resulting in said merged variable-curve means to adjust accordingly in a remaining allotted-distance thereof producing a broad variable-concept to said unique incurvate cutting-edge; thereby, providing a more definite radial direction to shearing when contains a work piece material in said prescribed direction; whereby near eliminating a premature slicing problem ,and provides a better control to a compound leverage resistance problem in said fixed insert cutting-unit further including:

a determined number of zone-cutting edges resulting from said groove means in said cutting plane in which each zone-cutting edge establishes an individual radial-path parameter from and around said axis-point with a cutting sharpness being influenced by either of two means of which the first is a pitch-angle means applied to said lead-face wall means of said insert cutting-unit embodiment to simulate thy predetermined helix angle used in said flutes of the insert-holding body, and the second means comprising:

a tapered concave swale means containing a predetermined size and appropriate shape being employed in each said lead-face wall means of said fixed insert cutting-unit, and provided by a machining and/or mechanical method means in a lower immediate-area of said unique cutting-edge being located so as to influence a near xyresic-sharpness to said unique incurvate cutting-edge; thereby, providing each said zone-cutting edge thereon with a superb cutting proficiency, and better control to produce a shaving that stays continual; with each shaving forming a unique helical-coil pattern that surrounds a preceding helical coil shaving starting a serried series process: of a small-diameter open-helical near said axis-point, then progressively increasing the diameter and compacting the helical-coil as the process moves out towards a peripheral-end of said zone-cutting edges; producing a compact unitized bundler of shavings collected into a single round continual-shaving; which provides a easy control and ejecting by said flutes.

14. The improved rotary end cutting tool according to claim 13, in which said unique removable insert cutting-unit further including: an upper-portional means of the unique residual core-area of said insert-holding body comprising: a residual core-area radius at said axis-point greater than one percent of said body diameter, an angle-point length means being a predetermined length of said embodiment from said axis-point, and a taper-angle means containing an adjusting-angle influenced between the radius at said axis-point and the predetermined bottom-width of said embodiment of said removable insert cutting-unit; at which said bottom-width angle-point a predetermined said flute-depth becomes constant and continues to said predetermined-point near said shank-end means of said insert-holding body; being controlled by said compounded-setup procedural means, proportioned impart, to said removable insert cutting-unit, and said insert-holding body; thereby, providing said removable insert cutting-unit with an appropriately small-area said chisel-point system that synthesizes with said unique cutting-edge while preserving a constant and optimum strength throughout said insert-holding body; whereby, demonstrating a uniquely stable, self-starting, and aggressive said chisel-point system synthesizing with said unique incurvate cutting-edge; which overall, produces a superior rotary end cutting system in comparison to a cutting system provided from a straight said residual core-area in said body.

15. The improved rotary end cutting tool according to claim 14, wherein said lag-face wall means of said flutes, being proportioned impart of said removable insert cutting-unit and impart on said insert-holding body, has two versions to provide the predetermined chip-extracting volumetric-area in said insert-holding body by using the compounded arc-line means defined as the composite of dissimilar correlated arc-lines, derived from each said arc-line having a unique radial-center from the other said arc-lines thereof, that orchestrates said predetermined volumetric-area conforming to said longitudinal length of said flute in which said lag-face wall comprising:

a first version that originates at said common bonding-point means on said second setup-plane means labeled true radius line and synthesizes with said merged variable-curve means of said lead-face wall means on said removable insert cutting-unit, and then continues to end at said peripheral-edge point of said insert-holding body; providing an appropriate predetermined said volumetric-area between said lead-face wall means on said removable insert cutting-unit and said lag-face wall means on said insert-holding body required to accept and eject a series of shavings produced from said unique cutting-edges; when said conical-end is immersed in a work piece material and rotated in said direction; whereas, said lag-face wall in a second improved version the predetermined compounded arc-line means originates at a end of a projected support-step partition means that starts and abruptly connects to said merged variable-curve means at said common bonding-point means, and extends out from said axis-point at a predetermined angle set-off said second setup-plane means to a predetermined length means that is directly influenced by said diameter, said volumetric-area requirement, and a base-width factor of said removable insert cutting-unit wherein the support-step partition provides an added-area to said embodiment in back of said unique cutting-edge on said cutting plane, and said chisel-point system, affording a maximum reinforcement thereof for extreme working employing without diminishing said volumetric-area from the scope of said flutes purpose in said insert-holding body.

* * * * *